United States Patent
Ueno et al.

(10) Patent No.: US 11,009,873 B2
(45) Date of Patent: May 18, 2021

(54) AUTOMATIC DRIVING CONTROL PLANNING APPARATUS AND AUTOMATIC DRIVING CONTROL PLANNING METHOD

(71) Applicant: Mitsubishi Electric Corporation, Tokyo (JP)

(72) Inventors: Yoshinori Ueno, Tokyo (JP); Mitsuo Shimotani, Tokyo (JP); Yoshitaka Nakamura, Tokyo (JP); Naohiko Obata, Tokyo (JP); Tadashi Miyahara, Tokyo (JP); Tomohiro Shiino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 205 days.

(21) Appl. No.: 16/342,384

(22) PCT Filed: Dec. 2, 2016

(86) PCT No.: PCT/JP2016/085850
§ 371 (c)(1),
(2) Date: Apr. 16, 2019

(87) PCT Pub. No.: WO2018/100725
PCT Pub. Date: Jun. 7, 2018

(65) Prior Publication Data
US 2019/0294163 A1    Sep. 26, 2019

(51) Int. Cl.
*G05D 1/00* (2006.01)
*B60W 30/18* (2012.01)
(Continued)

(52) U.S. Cl.
CPC .......... *G05D 1/0061* (2013.01); *B60W 30/00* (2013.01); *B60W 30/18* (2013.01); *B60W 50/14* (2013.01);
(Continued)

(58) Field of Classification Search
CPC ......... G05D 1/0061; G05D 2201/0213; G08G 1/16; G08G 1/0125; G08G 1/166;
(Continued)

(56) References Cited

U.S. PATENT DOCUMENTS 9,434,382 B1 * 9/2016 Prokhorov ........... G05D 1/0293
9,671,782 B2 * 6/2017 Yamaoka .............. B60W 30/00
(Continued)

FOREIGN PATENT DOCUMENTS

JP   2015-157604 A   9/2015
WO  2018/092201 A1  5/2018

OTHER PUBLICATIONS

International Search Report issued in PCT/JP2016/085850 (PCT/ISA/210), dated Feb. 28, 2017.

*Primary Examiner* — Richard M Camby
(74) *Attorney, Agent, or Firm* — Birch, Stewart, Kolasch & Birch, LLP

(57) ABSTRACT

An automatic driving control plan creation unit creates a plan of an automatic driving section in which a subject vehicle is automatically driven, and a plan of a driving switching preparation section for switching the subject vehicle from automatic driving to manual driving. For each point in the driving switching preparation section, a driving load calculation unit calculates a driving load applied to a driver when the driver manually drives the subject vehicle. A driving switching permission determination unit permits switching of the subject vehicle from automatic driving to manual driving at a point where the driving load is smaller than a predetermined threshold value, and does not permit switching of the subject vehicle from automatic driving to manual driving at a point where the driving load is equal to
(Continued)

or larger than the threshold value. A permission standard relaxation unit makes the driving load difficult to exceed the threshold value.

20 Claims, 26 Drawing Sheets

(51) Int. Cl.
    *B60W 50/14*     (2020.01)
    *G08G 1/16*     (2006.01)
    *B60W 30/00*     (2006.01)
    *B60W 50/00*     (2006.01)
    *G08G 1/01*     (2006.01)

(52) U.S. Cl.
    CPC ....... *G08G 1/16* (2013.01); *B60W 2050/0071* (2013.01); *B60W 2050/0073* (2013.01); *B60W 2050/0088* (2013.01); *B60W 2050/146* (2013.01); *B60W 2400/00* (2013.01); *B60W 2556/00* (2020.02); *G05D 2201/0213* (2013.01); *G08G 1/0125* (2013.01)

(58) Field of Classification Search
    CPC ...... B60W 30/00; B60W 30/18; B60W 50/14; B60W 2556/00; B60W 2050/0071; B60W 2050/0073; B60W 2050/0088; B60W 2050/146; B60W 2400/00; B60W 60/0057
    See application file for complete search history.

(56) References Cited

U.S. PATENT DOCUMENTS

| | | | |
|---|---|---|---|
| 10,067,505 B2* | 9/2018 | Ichikawa | B60W 60/0053 |
| 2009/0268022 A1* | 10/2009 | Omi | A61B 5/18 |
| | | | 348/135 |
| 2015/0006028 A1* | 1/2015 | Strauss | B60W 60/0051 |
| | | | 701/36 |
| 2016/0347327 A1 | 12/2016 | Kondo et al. | |

* cited by examiner

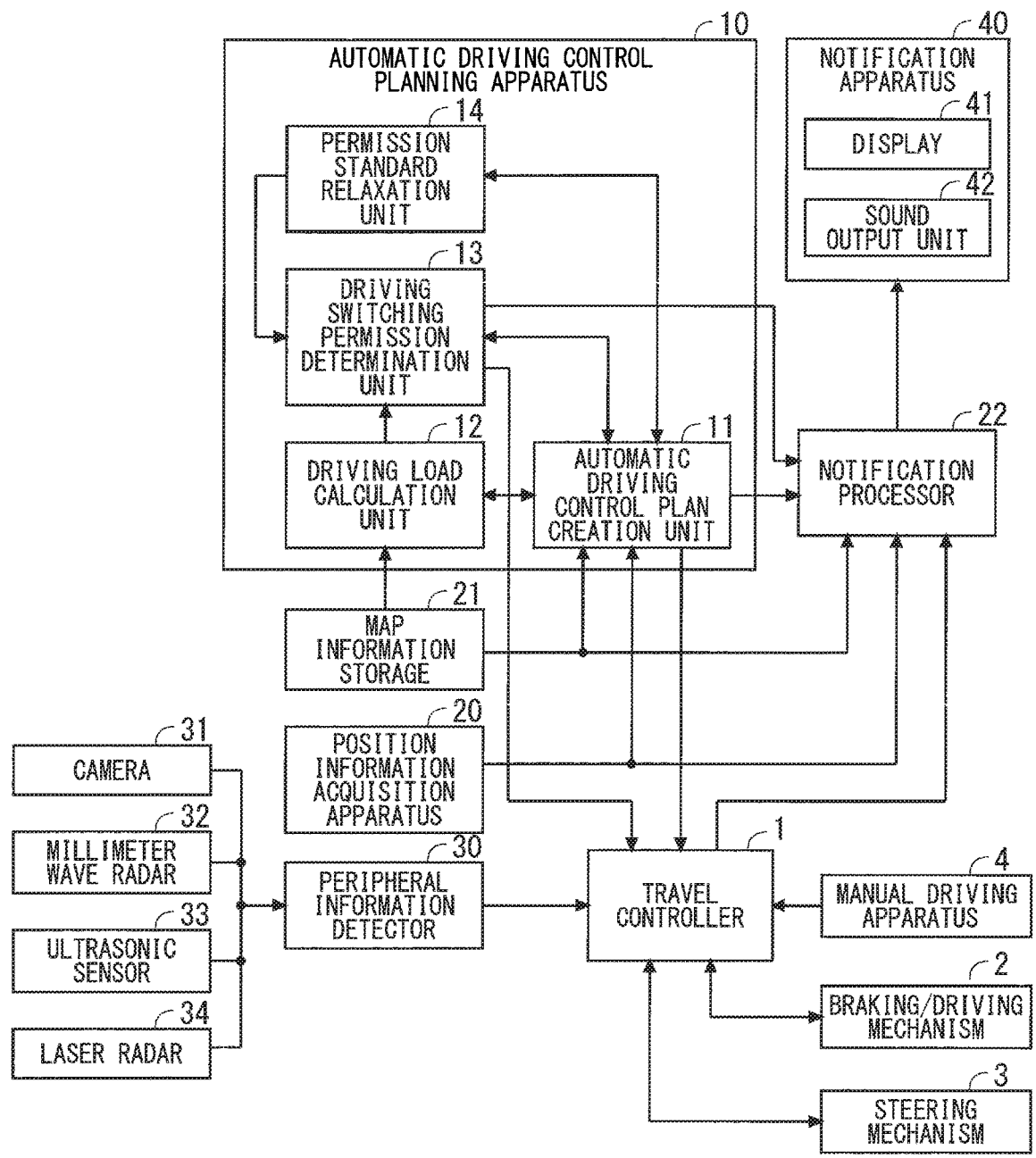

| VISIBLE DISTANCE (d) | DRIVING LOAD (W2) |
|---|---|
| d<50m | 3 POINTS |
| 50m≦d<100m | 2 POINTS |
| d≧100m | 0 POINTS |

| ROAD ATTRIBUTE | DRIVING LOAD (W3) |
|---|---|
| INTERSECTION | 5 POINTS |
| BRANCH POINT | 3 POINTS |
| JUNCTION | 3 POINTS |
| OTHER | 0 POINTS |

F I G . 2 0
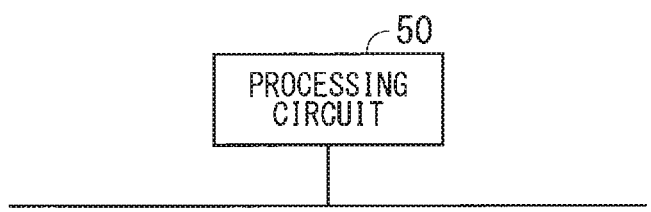
F I G . 2 1
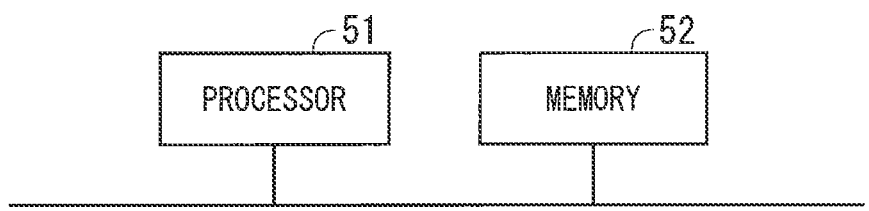

F I G. 47
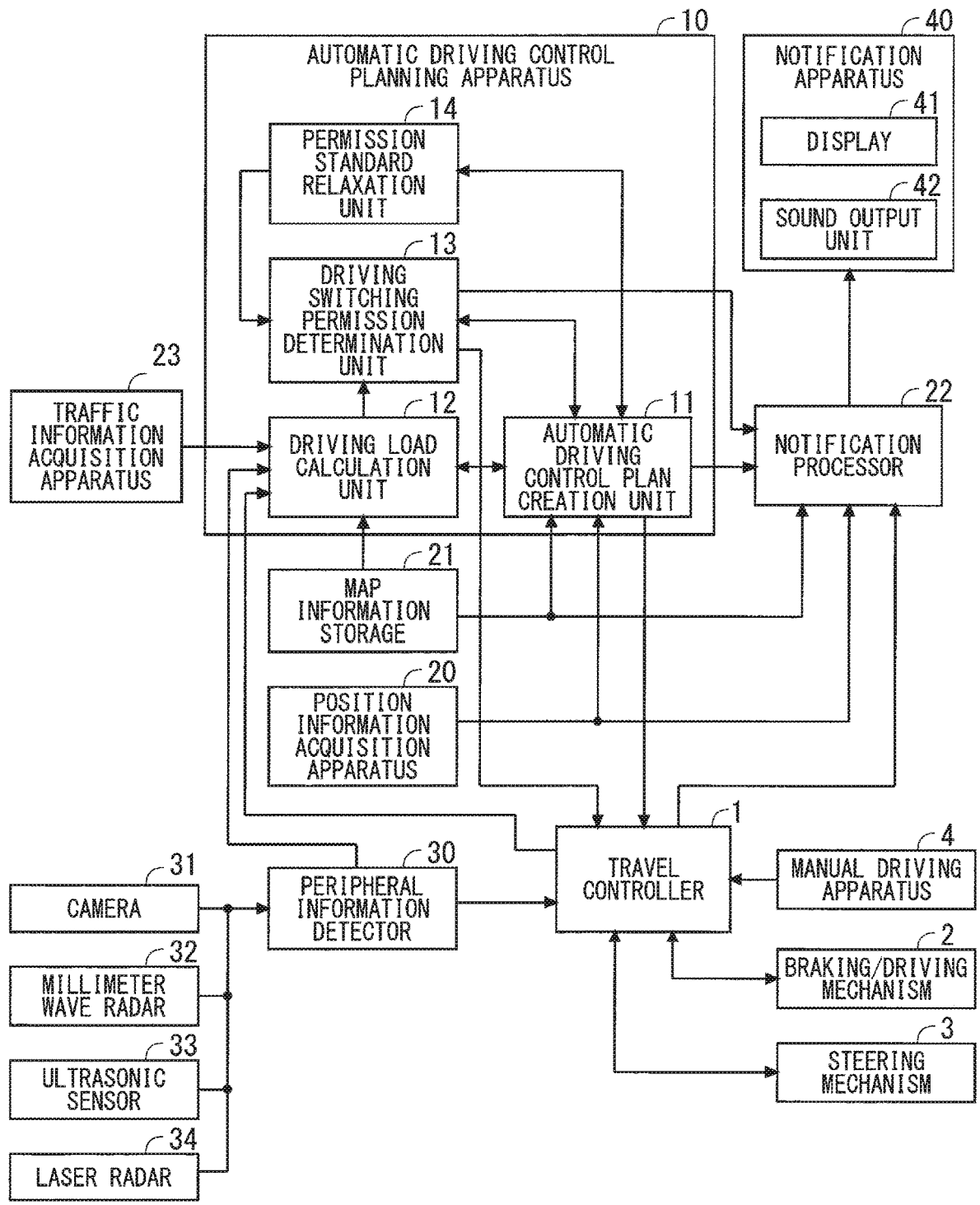

AUTOMATIC DRIVING CONTROL PLANNING APPARATUS AND AUTOMATIC DRIVING CONTROL PLANNING METHOD

TECHNICAL FIELD

The present invention relates to a technique for developing an automatic driving control plan of a vehicle, and particularly relates to a technique for determining a preparation section for switching a vehicle traveling by automatic driving to manual driving.

BACKGROUND ART

There has been proposed an automatic driving support system that prompts a driver to switch to manual driving when the vehicle traveling by automatic driving approaches an end point of an automatic driving section (a section where automatic driving is planned). For example, Patent Document 1 below proposes an automatic driving support system that defines a section (hereinafter referred to as "driving switching preparation section") for switching from automatic driving to manual driving, by excluding a section where it is determined that a driving load applied to a driver in switching to manual driving is large.

PRIOR ART DOCUMENTS

Patent Documents

Patent Document 1: Japanese Patent Application Laid-Open No. 2015-157604

SUMMARY

Problem to be Solved by the Invention

As in the technique of Patent Document 1, if a section where a driving load on a driver is large is excluded from the driving switching preparation section, a burden on the driver in switching to manual driving can be reduced. However, there arises a problem that a substantial length of the driving switching preparation section is shortened correspondingly. In Patent Document 1, if the driving switching preparation section does not have a sufficient length, the above problem is solved by shifting the driving switching preparation section to a front side until a sufficient length can be secured.

However, if the driving switching preparation section is shifted to the front side, an end point of the driving switching preparation section, that is, an end point of the automatic driving section is also shifted to the front side, which shortens the automatic driving section. That is, the section where a burden on the driver can be reduced by performing automatic driving is shortened, which consequently leads to an increase of a burden on the driver.

The present invention has been made to solve the above-mentioned problem, and it is an object of the present invention to provide an automatic driving control planning apparatus capable of securing a sufficiently long driving switching preparation section while maintaining a length of the automatic driving section.

Means to Solve the Problem

An automatic driving control planning apparatus according to the present embodiment includes: an automatic driving control plan creation unit to create an automatic driving control plan including a plan of an automatic driving section that is a section in which a subject vehicle is automatically driven, and a plan of a driving switching preparation section that is a section for switching the subject vehicle from automatic driving to manual driving at a final stage of the automatic driving section; a driving load calculation unit to calculate, for each point of the driving switching preparation section, a driving load applied to a driver when the driver manually drives the subject vehicle; a driving switching permission determination unit to permit switching of the subject vehicle from automatic driving to manual driving at a point where the driving load calculated by the driving load calculation unit is smaller than a predetermined threshold value, and not to permit switching of the subject vehicle from automatic driving to manual driving at a point where the driving load is equal to or larger than the threshold value; and a permission standard relaxation unit to relax a standard for permitting switching of the subject vehicle from automatic driving to manual driving as the subject vehicle approaches an end point of the driving switching preparation section, by making the driving load difficult to exceed the threshold value.

Effects of the Invention

As time elapses after the subject vehicle enters the driving switching preparation section, awareness of a driver for manual driving increases. Therefore, magnitude of a driving load that the driver can tolerate increases as the subject vehicle approaches the end point of the driving switching preparation section. Therefore, in the present invention, as the subject vehicle approaches the end point of the driving switching preparation section, a standard for permitting switching of the subject vehicle from automatic driving to manual driving is relaxed. As a result, an increase of a length of a section where switching to manual driving is not permitted is suppressed, and an excessive reduction in a length of the driving switching preparation section is prevented. Further, unlike shifting the driving switching preparation section, the length of the automatic driving section is maintained.

Objects, features, aspects, and advantages of the present invention will become more apparent from the following detailed description and the accompanying drawings.

BRIEF DESCRIPTION OF DRAWINGS

FIG. 1 is a block diagram showing a configuration of a vehicle control system according to a first embodiment.

FIG. 2 is a view showing an example of a calculation method of a driving load.

FIG. 20 is a diagram showing an example of a hardware configuration of an automatic driving control planning apparatus.

FIG. 21 is a diagram showing an example of a hardware configuration of the automatic driving control planning apparatus.

FIG. 47 is a block diagram showing a configuration of a vehicle control system according to a fourth embodiment.

DESCRIPTION OF EMBODIMENTS

First Embodiment

Figures 3, 4, 5:
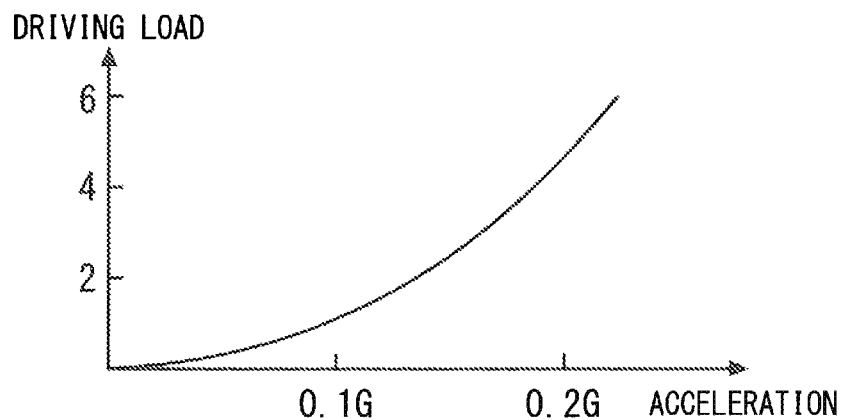
FIG. 3 is a view showing an example of the calculation method of a driving load.
FIG. 4 is a view showing an example of the calculation method of a driving load.
FIG. 5 is a view showing an example of the calculation method of a driving load.

FIG. 1 is a block diagram showing a configuration of a vehicle control system according to a first embodiment. As shown in FIG. 1, the vehicle control system includes a travel controller 1, a braking/driving mechanism 2, a steering mechanism 3, a manual driving apparatus 4, an automatic driving control planning apparatus 10, a position information acquisition apparatus 20, a map information storage 21, a notification processor 22, a peripheral information detector 30, and a notification apparatus 40. The peripheral information detector 30 is connected with a camera 31, a millimeter wave radar 32, an ultrasonic sensor 33, and a laser radar 34 of a vehicle mounted with the vehicle control system. Hereinafter, a vehicle mounted with the vehicle control system will be referred to as "subject vehicle", and a vehicle other than the subject vehicle will be referred to as "non-subject vehicle".

The travel controller 1 controls the braking/driving mechanism 2 and the steering mechanism 3 to control traveling of the subject vehicle. The braking/driving mechanism 2 is a mechanism to control a traveling speed of the subject vehicle and switch between forward movement and backward movement, and includes an accelerator, a brake, a shift, and the like, for example. The steering mechanism 3 is a mechanism to turn a traveling direction of the subject vehicle to the left and right, and includes a steering component or the like, for example.

The manual driving apparatus 4 is operation means to manually drive the subject vehicle, and includes, for example, a steering wheel, an accelerator pedal, a brake pedal, a shift lever, and the like.

The peripheral information detector 30 acquires, from the camera 31, the millimeter wave radar 32, the ultrasonic sensor 33, the laser radar 34, and the like mounted on the subject vehicle, information that is related to a peripheral situation of the subject vehicle and is required for automatic driving of the subject vehicle (hereinafter referred to as "peripheral information"). As the peripheral information acquired by the peripheral information detector 30, for example, a position of a lane of a road on which the subject vehicle is traveling, positions of a non-subject vehicle, a pedestrian and an obstacle that are present around the subject vehicle, a state of traffic lights, and the like are considered.

The automatic driving control planning apparatus 10 develops an automatic driving control plan of the subject vehicle on the basis of a planned traveling route of the subject vehicle. The automatic driving control plan developed by the automatic driving control planning apparatus 10 includes a plan of an "automatic driving section" that is a section where the subject vehicle is automatically driven on the planned traveling route, and a plan of a "driving switching preparation section" that is a section for switching the subject vehicle from automatic driving to manual driving at a final stage of the automatic driving section. Meanwhile, the planned traveling route of the subject vehicle is set by a navigation system (not shown) of the subject vehicle. The planned traveling route of the subject vehicle may be a route to a destination set by a user, or may be a route estimated from a travel history of the subject vehicle. Further, the navigation system to determine the planned traveling route of the subject vehicle may be mounted on the subject vehicle, or may be one using a navigation function of a mobile phone, a smartphone, or the like. For simplicity of explanation, in the present embodiment, it is assumed that the planned traveling route of the subject vehicle is set in advance.

When the driver has driving authority of the subject vehicle, the travel controller 1 performs manual driving of the subject vehicle by controlling the braking/driving mechanism 2 and the steering mechanism 3 in accordance with an operation of the manual driving apparatus 4 by the driver. On the other hand, when the travel controller 1 has the driving authority of the subject vehicle, the travel controller 1 performs automatic driving of the subject vehicle by controlling the braking/driving mechanism 2 and the steering mechanism 3 in accordance with the automatic driving control plan developed by the automatic driving control planning apparatus 10.

Further, when performing automatic driving of the subject vehicle, the travel controller 1 performs, on the braking/driving mechanism 2, for example, control for running the subject vehicle at a constant speed, control for keeping a constant distance between the subject vehicle and a non-subject vehicle, control for stopping before a pedestrian or an obstacle, and the like. Further, the travel controller 1 performs, on the steering mechanism 3, for example, control for preventing the subject vehicle from deviating from a lane in which the subject vehicle is traveling, control for allowing the subject vehicle to avoid a pedestrian, an obstacle, and the like. By combining the control on the braking/driving mechanism 2 and the steering mechanism 3, it is possible to run the subject vehicle to follow a non-subject vehicle (preceding vehicle) and to run along the planned traveling route.

Here, in the Japanese strategic innovation creation program (SIP) research and development plan of automated driving system (Cabinet Office, Jun. 23, 2016), the automated level (automatic driving level) of automatic driving of automobiles is defined as follows.

Level 1: A state where a system performs any one of acceleration, steering, and braking Level 2: A state where the system performs multiple operations among acceleration, steering, and braking Level 3: A state where the system performs all of acceleration, steering, and braking, and a driver handles when the system requests Level 4: All of acceleration, steering, and braking are performed by other than the driver, and the driver is not involved at all Note that the above "system" means a mechanism in which an automobile determines a road environment and the like from information obtained by an autonomous sensor, communication, and the like, and performs all or a part of acceleration, steering, and braking of the automobile. In the vehicle control system of FIG. 1, the travel controller 1 corresponds to the "system".

As can be seen from the definition of each level, driving authority of the automobile is on the system side at level 3 or higher, and on the driver side at level 2 or lower. In the present embodiment, "automatic driving" refers to automatic driving at level 3, "manual driving" refers to a state (level 0) in which the driver performs automatic driving of level 2 or lower and all of acceleration, steering, and braking. Further, in an embodiment, automatic driving control of level 4 is not discussed for simplicity of description.

As shown in FIG. 1, the position information acquisition apparatus 20, the map information storage 21, and the notification processor 22 are connected to the automatic driving control planning apparatus 10.

The position information acquisition apparatus 20 acquires information on a current position of the subject vehicle. Specifically, the position information acquisition apparatus 20 receives a positioning signal transmitted from, for example, a satellite of a global navigation satellite system (GNSS) such as a global positioning system (GPS), and calculates a current position of the subject vehicle from the positioning signal.

The map information storage 21 is a storage medium storing map information. The map information stored in the map information storage 21 is not only information of a road network, but various types of information to be used for automatic driving control are also stored (e.g., a speed limit of each road, clarity of a road marking, and the like). Here, it is assumed that the map information storage 21 is mounted on the subject vehicle, but the map information storage 21 may be configured as a server that provides map information to the automatic driving control planning apparatus 10 via wireless communication.

Next, details of the automatic driving control planning apparatus 10 will be described. As shown in FIG. 1, the automatic driving control planning apparatus 10 includes an automatic driving control plan creation unit 11, a driving load calculation unit 12, a driving switching permission determination unit 13, and a permission standard relaxation unit 14.

The automatic driving control plan creation unit 11 creates an automatic driving control plan of the subject vehicle on the basis of a planned traveling route of the subject vehicle and map information stored in the map information storage 21. As described above, the automatic driving control plan includes a plan of the automatic driving section that is a section where the subject vehicle is automatically driven, and a plan of the driving switching preparation section that is a section for switching the subject vehicle from automatic driving to manual driving at a final stage of the automatic driving section. For the automatic driving section, a section where automatic driving control is permitted in advance is allocated, such as expressways and highways, for example. For the driving switching preparation section, a last fixed length section of the automatic driving section is allocated. The length of the driving switching preparation section may be defined by a distance, or may be defined by a length of time required for traveling.

For each point in the driving switching preparation section, the driving load calculation unit 12 calculates a driving load applied to a driver when the driver manually drives the subject vehicle. This driving load is calculated on the basis of at least one or more of a road shape, a road attribute, and a situation of automatic driving of the subject vehicle, at each point. For example, the driving load is calculated as a large value at a point where operation of an accelerator, a brake, or a steering wheel is required (e.g., a curve, a slope, a lane change point, a change point of a speed limit, a change point of a road attribute, and the like), at a point where acceleration is generated and a posture of the driver is not stable, and at a specific section that requires attention in driving (e.g., in a tunnel, a junction, a branch point, and the like) FIGS. 2 to 4 show examples of a calculation method of a driving load.

FIG. 2 shows an example in which a driving load W1 at each point is calculated on the basis of an acceleration g generated when the subject vehicle travels at that point. In the example of FIG. 2, the driving load W1 at a point where the acceleration g is calculated to be less than 0.07 G is defined to be 0 points, the driving load W1 at a point where the acceleration g is calculated to be 0.07 G or more and less than 0.1 G is defined to be 1 point, the driving load W1 at a point where the acceleration g is calculated to be 0.1 G or more and less than 0.2 G is defined to be 3 points, and the driving load W1 at a point where the acceleration g is calculated to be 0.2 G or more is defined to be 5 points. The acceleration g may be a longitudinal acceleration obtained from a change amount of a traveling speed of the subject vehicle, but may be a sum of vectors of the longitudinal acceleration and a lateral acceleration obtained from a curvature of a road and a traveling speed of the subject vehicle.

FIG. 3 shows an example in which a driving load W2 at each point is calculated on the basis of poor visibility of the point. A visible distance d can be calculated from a road shape, a position of a building, and the like. In the example of FIG. 3, the driving load W2 at a point where the visible distance d is 100 m or more is defined to be 0 points, the driving load W2 at a point where the visible distance is 50 m or more and less than 100 m is defined to be 2 points, and the driving load W2 at a point where the visible distance d is less than 50 m is defined to be 3 points.

FIG. 4 shows an example in which a driving load W3 at each point is calculated on the basis of a road attribute at that point. In the example of FIG. 4, the driving load W3 at an intersection is defined to be 5 points, the driving load W3 at both a branch point and a junction of a road is defined to be 3 points, and the driving load at other points (points where there is no branch, merge, or the like) is defined to be 0 points.

The driving load at each point may be calculated on the basis of a plurality of items. For example, the driving load at each point may be a total of the driving load W1 calculated from the acceleration g, the driving load W2 calculated from poor visibility (the visible distance d), and the driving load W3 calculated from a road attribute.

In addition, while FIGS. 2 to 4 show the examples in which the driving loads W1, W2, and W3 take discrete values (points), but the driving load may take a continuous value. For example, a graph of FIG. 5 shows an example in which the driving load is set to take a continuous value that increases in a quadratic curve shape with respect to magnitude of an acceleration.

Returning to FIG. 1 the driving switching permission determination unit 13 of the automatic driving control planning apparatus 10 determines whether or not to permit switching of the subject vehicle from automatic driving to manual driving, on the basis of the driving load at each point calculated by the driving load calculation unit 12. Specifically, the driving switching permission determination unit 13 determines to permit switching of the subject vehicle from automatic driving to manual driving at a point where the driving load is smaller than a predetermined threshold value (hereinafter referred to as "switching determination threshold value"), and not to permit switching of the subject vehicle from automatic driving to manual driving at a point where the driving load is equal to or larger than the switching determination threshold value. Hereinafter, a section where switching to manual driving is permitted by the driving switching permission determination unit 13 in the driving switching preparation section is referred to as "switching-permitted section", and a section where it is not permitted is referred to as "switching-inhibited section".

The permission standard relaxation unit 14 relaxes a standard for permitting switching of the subject vehicle from automatic driving to manual driving as the subject vehicle approaches an end point of the driving switching preparation section, by making a driving load difficult to exceed the switching determination threshold value. Specifically, the permission standard relaxation unit 14 increases the switching determination threshold value set in the driving switching permission determination unit 13 as the subject vehicle approaches the end point of the driving switching preparation section.

Normally, as time elapses after the subject vehicle enters the driving switching preparation section, awareness of a driver for manual driving increases. Therefore, magnitude of a driving load that the driver can tolerate increases as the subject vehicle approaches the end point of the driving switching preparation section. Therefore, even if the standard for permitting switching from automatic driving to manual driving is relaxed as the subject vehicle approaches the end point of the driving switching preparation section, the driver is unlikely to feel as a heavy burden.

Figure 6:
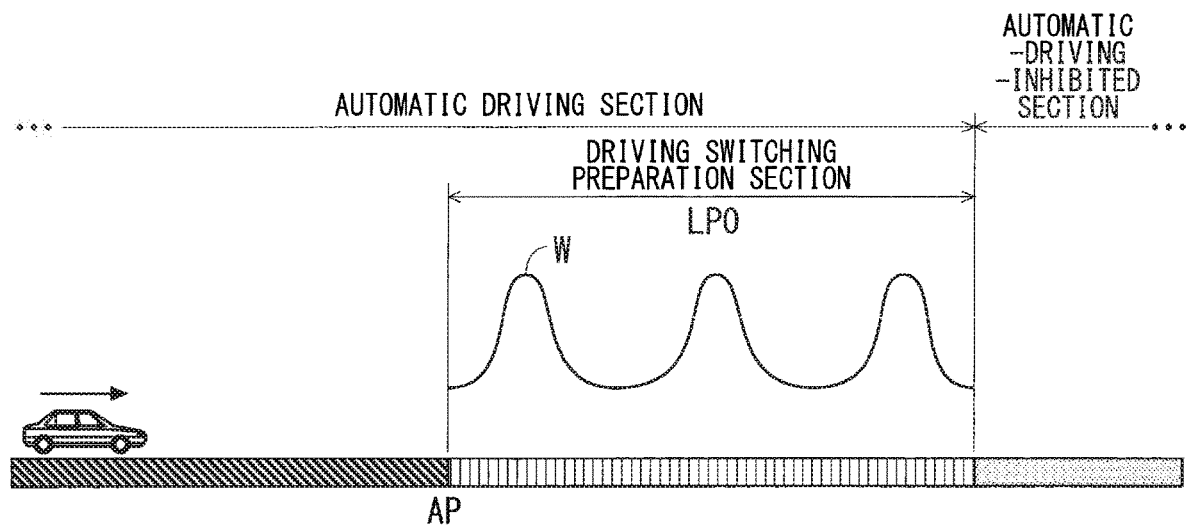
FIG. 6 is a view for explaining an operation of a permission standard relaxation unit.
Figure 7:
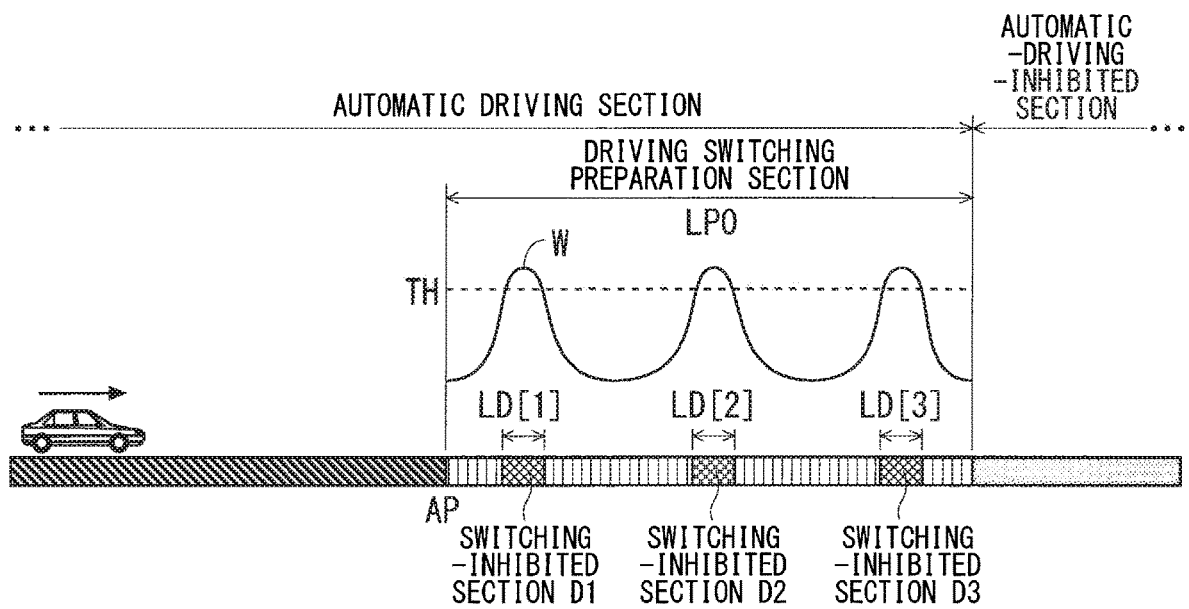
FIG. 7 is a view for explaining an operation of the permission standard relaxation unit.
Figure 8:
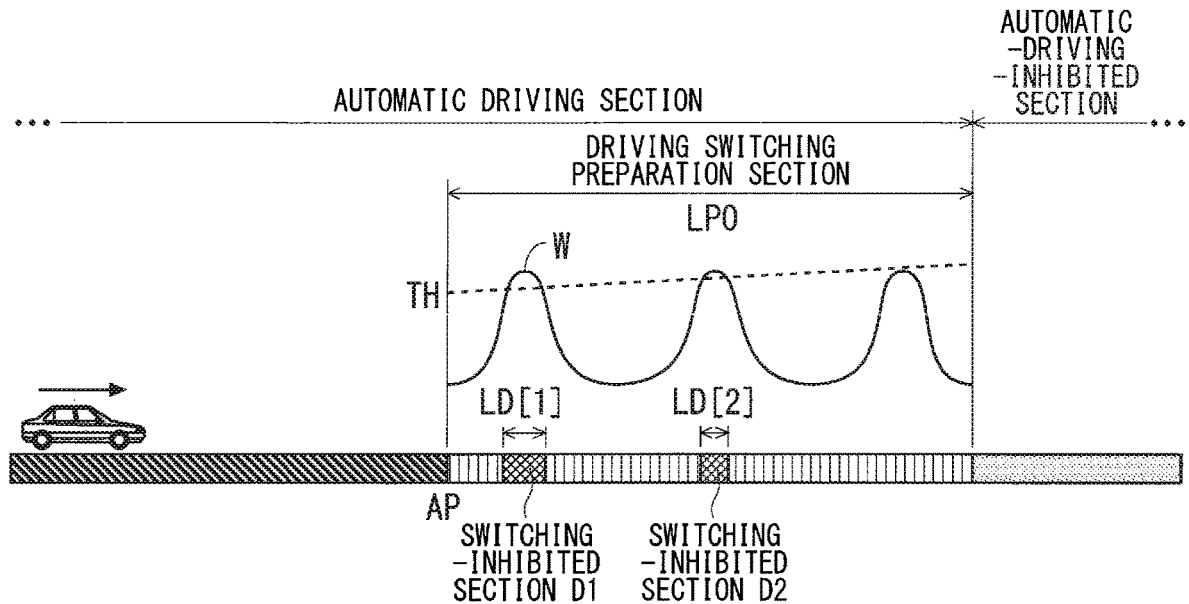
FIG. 8 is a view for explaining an operation of the permission standard relaxation unit.

FIGS. 6 to 8 are views for explaining an operation of the permission standard relaxation unit 14. For example, it is assumed that the automatic driving control plan creation unit 11 has created an automatic driving control plan provided with the driving switching preparation section of a length LP0 at the end of the automatic driving section as shown in FIG. 6 (a reference sign "AP" indicates a start point of the driving switching preparation section). Further, it is assumed that, in the driving switching preparation section, the driving load calculation unit 12 calculates a driving load W with a waveform as shown in FIG. 6.

If the driving switching permission determination unit 13 determines whether or not to permit switching from automatic driving to manual driving on the basis of a certain switching determination threshold value TH as shown in FIG. 7, three switching-inhibited sections D1, D2, and D3 are generated in the driving switching preparation section. Since switching from automatic driving to manual driving is not permitted in the switching-inhibited section, a substantial length of the driving switching preparation section is shortened by a total of lengths of the switching-inhibited sections D1, D2, and D3. That is, when the lengths of the switching-inhibited sections D1, D2, and D3 are LD[1], LD[2], and LD[3], the substantial length of the driving switching preparation section is LP0 (LD[1]+LD[2]+LD[3]).

On the other hand, in the present embodiment, as shown in FIG. 8, the permission standard relaxation unit 14 increases the switching determination threshold value TH as the subject vehicle approaches the end point of the driving switching preparation section. When the driving switching permission determination unit 13 determines whether or not to permit switching from automatic driving to manual driving on the basis of such the switching determination threshold value TH, only two switching-inhibited sections D1 and D2 are generated within the driving switching preparation section (the switching-inhibited section D3 in FIG. 7 is not generated). In addition, the lengths of the switching-inhibited sections D1 and D2 are shorter than those in the case of FIG. 7. That is, the substantial length of the driving switching preparation section is LP0−(LD[1]+LD[2]), and the value of LD[1]+LD[2] is smaller than that in the case of FIG. 7. Therefore, the substantial length of the driving switching preparation section is secured longer than that in the case of FIG. 7.

With the processing of the permission standard relaxation unit 14, it is possible to shorten the length of the switching-inhibited section generated particularly in the latter half of the driving switching preparation section. Further, depending on conditions, it is possible to reduce the number of switching-inhibited sections generated in the driving switching preparation section. Therefore, the substantial length of the driving switching preparation section is sufficiently secured. In addition, since the permission standard relaxation unit 14 does not move a position of an end point of the driving switching preparation section (that is, an end point of the automatic driving section), the length of the automatic driving section is maintained.

Figure 9:
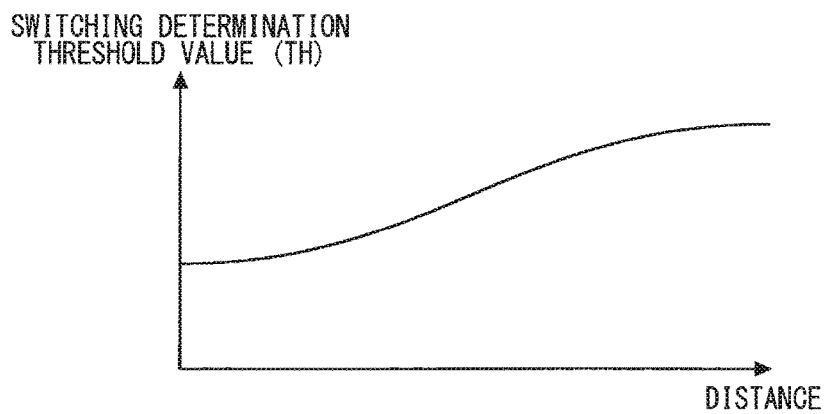
FIG. 9 is a graph showing an example of a switching determination threshold value.
Figure 10:
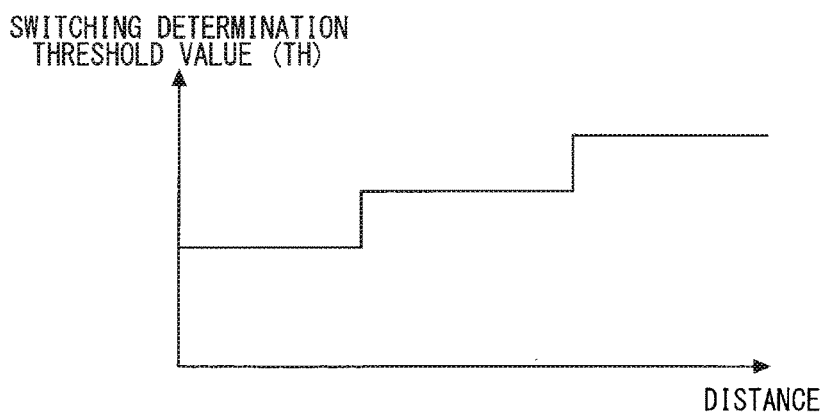
FIG. 10 is a graph showing an example of the switching determination threshold value.
Figure 11:
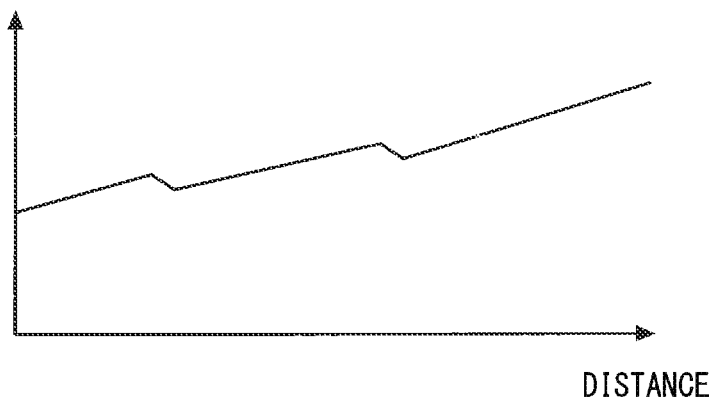
FIG. 11 is a graph showing an example of the switching determination threshold value.

In FIG. 8, an example is shown in which the permission standard relaxation unit 14 linearly increases the switching determination threshold value TH with respect to a distance from the start point AP of the driving switching preparation section; however, the increase may be in a curved manner as shown in FIG. 9 or may be stepwise as shown in FIG. 10. In addition, as viewed macroscopically, it is sufficient that the switching determination threshold value TH increases as the subject vehicle approaches the end point of the driving switching preparation section, and it falls within the technical scope of the present invention even there is a locally small portion as shown in FIG. 11, for example.

Returning to FIG. 1 again, the automatic driving control plan creation unit 11 of the automatic driving control planning apparatus 10 sends the created automatic driving control plan to the travel controller 1 and the notification processor 22. In addition, the driving switching permission determination unit 13 sends, to the travel controller 1 and the notification processor 22, a notification (hereinafter referred to as "determination result notification") indicating a determination result as to whether or not to permit switching of the subject vehicle from automatic driving to manual driving.

The notification processor 22 controls the notification apparatus 40 that presents information to the driver of the subject vehicle, on the basis of an automatic driving control plan acquired from the automatic driving control plan creation unit 11, a determination result notification received from the driving switching permission determination unit 13, a current position of the subject vehicle acquired by the position information acquisition apparatus 20, and map information stored in the map information storage 21. This allows the notification processor 22 to notify the driver of various kinds of information.

For example, when the subject vehicle enters the driving switching preparation section, the notification processor 22 notifies the driver of the fact, by using the notification apparatus 40. Further, after the subject vehicle enters the driving switching preparation section, the notification processor 22 uses the notification apparatus 40 to notify the driver of a current situation as to whether or not switching to the manual driving of the subject vehicle is permitted. A specific example of the notification performed by the notification processor 22 will be described later.

Figure 12:
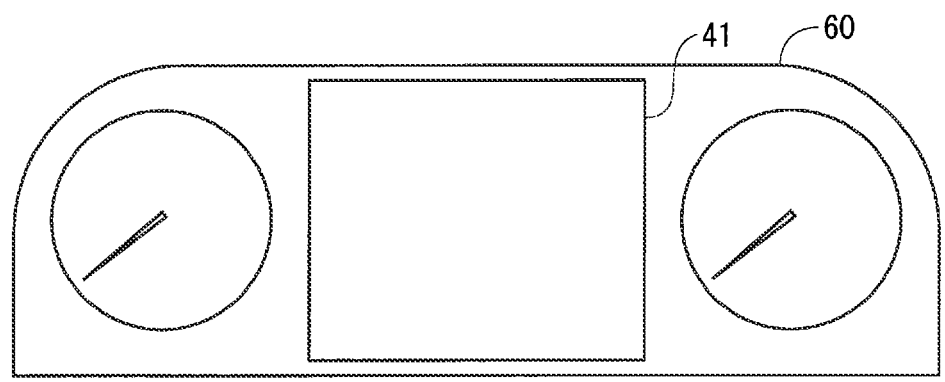
FIG. 12 is a view showing an arrangement example of a display of a notification apparatus.

In the present embodiment, the notification apparatus 40 includes a display 41 that outputs information as an image, and a sound output unit 42 that outputs information as sound. A position where the display 41 is installed may be any position within the subject vehicle as long as it is a position where the driver can easily recognize the display 41 visually. For example, as shown in FIG. 12, it is conceivable to arrange the display 41 in an instrument panel 60 of the driver's seat of the subject vehicle.

The display 41 of the notification apparatus 40 may be a screen of a car navigation system mounted on the subject vehicle. Further, the sound output unit 42 may be a speaker of an audio system mounted on the subject vehicle. Furthermore, the notification apparatus 40 may be realized by using other apparatus having display means and sound output means, such as a mobile phone or a smartphone.

FIG. 1 shows the notification processor 22 as a separate apparatus from the automatic driving control planning apparatus 10, but the notification processor 22 may be incorporated in the automatic driving control planning apparatus 10. That is, the automatic driving control planning apparatus 10 and the notification processor 22 may be configured integrally.

Figure 13:
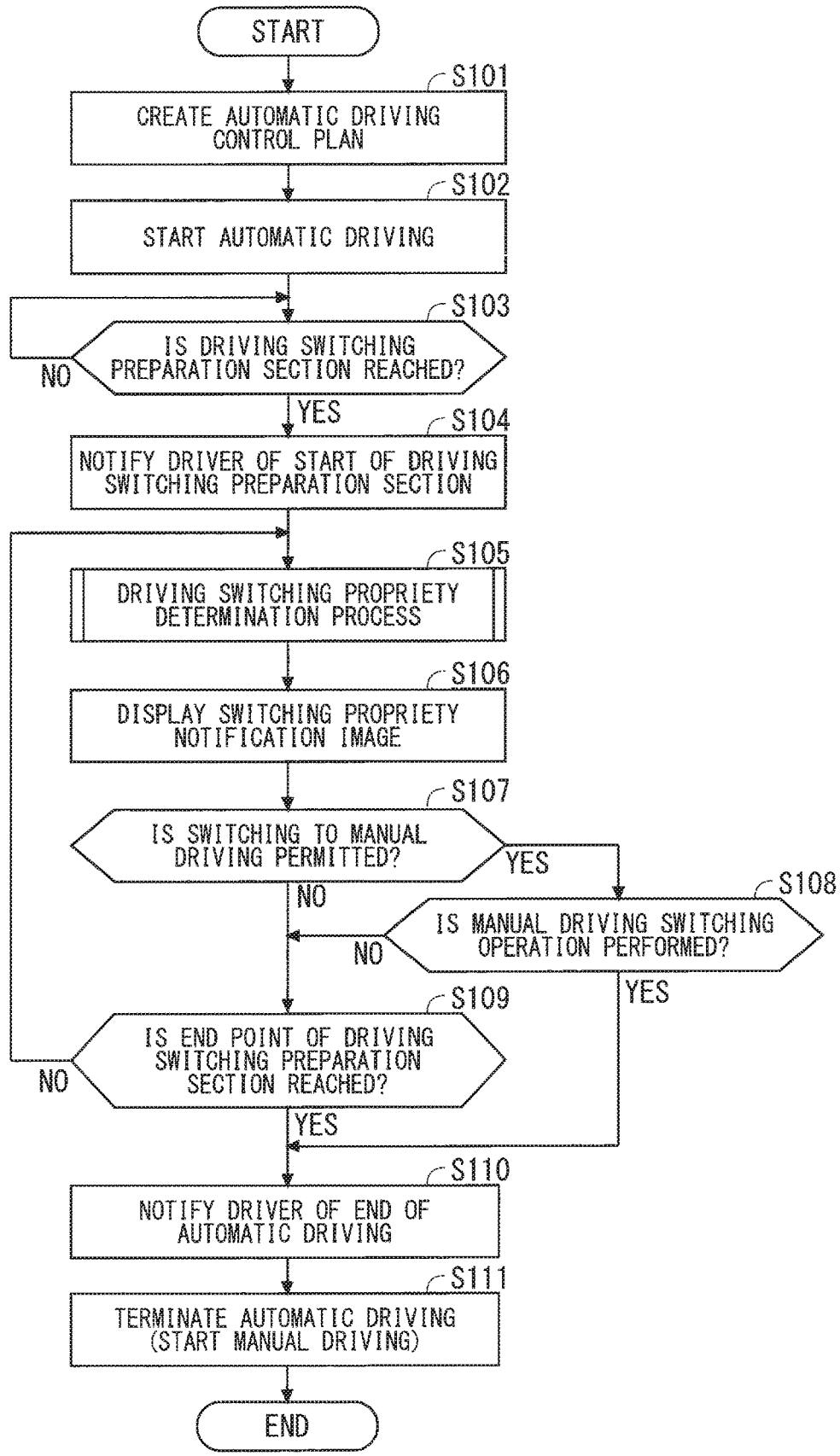
FIG. 13 is a flowchart showing an operation of the vehicle control system according to the first embodiment.
Figure 14:
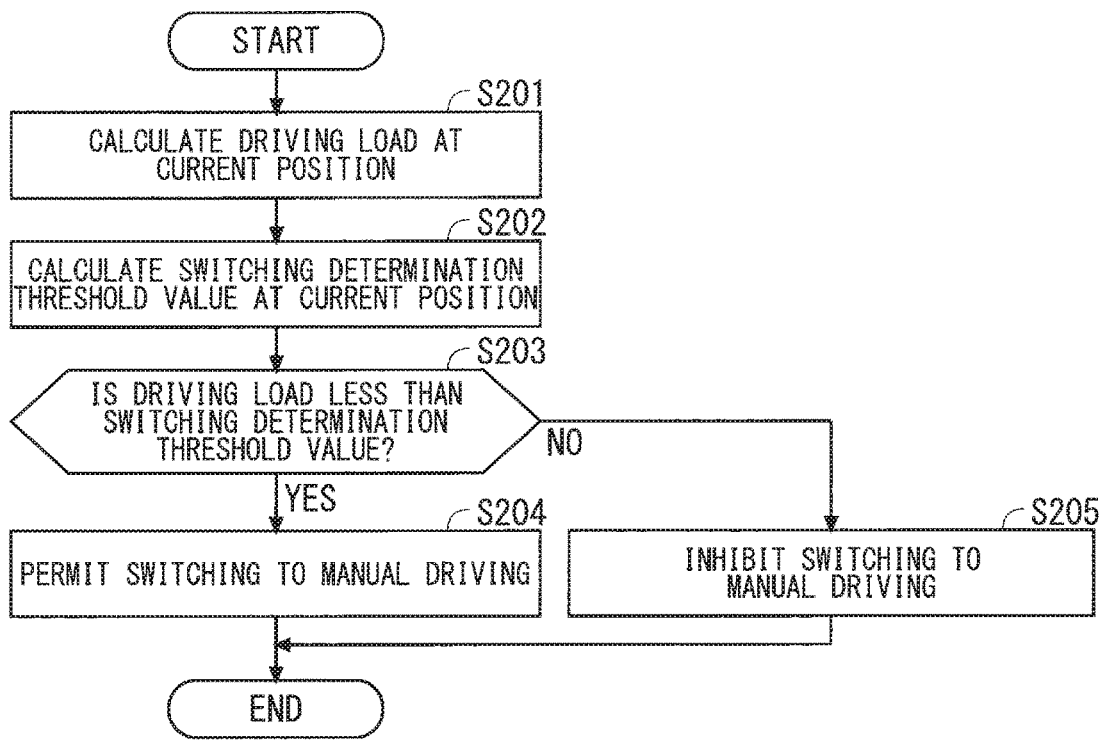
FIG. 14 is a flowchart showing a driving switching propriety determination process.

FIG. 13 is a flowchart showing an operation of the vehicle control system according to the first embodiment. Further, FIG. 14 is a flowchart showing a "driving switching propriety determination process" (step S105) in the flow of FIG. 13. Hereinafter, an operation of the vehicle control system according to the first embodiment will be described with reference to FIGS. 13 and 14. Note that the flow of FIG. 13 is executed when automatic driving of the subject vehicle is performed.

When the driver performs an operation for performing automatic driving of the subject vehicle, the automatic driving control plan creation unit 11 of the automatic driving control planning apparatus 10 creates an automatic driving control plan on the basis of a planned traveling route of the subject vehicle and map information acquired from the map information storage 21 (step S101). The automatic driving control plan includes a plan of the automatic driving section and a plan of the driving switching preparation section.

Next, the travel controller 1 starts automatic driving of the subject vehicle (step S102). That is, driving authority of the subject vehicle is shifted from the driver to the travel controller 1, and the travel controller 1 performs automatic control of the braking/driving mechanism 2 and the steering mechanism 3, on the basis of an automatic driving control plan developed in step S101 and the peripheral information acquired by the peripheral information detector 30.

While automatic driving of the subject vehicle is being performed, the notification processor 22 checks whether or not the subject vehicle has reached the driving switching preparation section (step S103), on the basis of a current position of the subject vehicle acquired by the position information acquisition apparatus 20 and map information stored in the map information storage 21. The notification processor 22 waits until the subject vehicle reaches the driving switching preparation section (NO in step S103).

When the subject vehicle reaches the driving switching preparation section (YES in step S103), the notification processor 22 uses the notification apparatus 40 to notify the driver of a start of the driving switching preparation section (step S104). As a specific example of the notification in step S104, for example, it is conceivable that the notification processor 22 causes the sound output unit 42 of the notification apparatus 40 to output a voice message "Entered the driving switching preparation section" at a timing when the subject vehicle enters the driving switching preparation section.

The notification of step S104 may be performed before the timing of entering the driving switching preparation section. For example, at a timing one minute before the subject vehicle enters the driving switching preparation section, the notification processor 22 may cause the sound output unit 42 of the notification apparatus 40 to output a voice message "Entering the driving switching preparation section in one minute".

Subsequently, the automatic driving control planning apparatus 10 performs the "driving switching propriety determination process" for determining whether or not to permit switching of the subject vehicle from automatic driving to manual driving (step S105). In the driving switching propriety determination process, the flow shown in FIG. 14 is executed in the automatic driving control planning apparatus 10.

First, the driving load calculation unit 12 calculates a driving load when the driver manually drives at a current position on the basis of a current position of the subject vehicle acquired by the position information acquisition apparatus 20, map information stored in the map information storage 21, and a state of automatic driving of the subject vehicle (a traveling speed, a steering angle, and the like) (step S201). Subsequently, the permission standard relaxation unit 14 calculates a switching determination threshold value at the current position on the basis of the current position of the subject vehicle acquired by the position information acquisition apparatus 20 (step S202). At this time, the permission standard relaxation unit 14 increases the switching determination threshold value as the subject vehicle approaches an end point of the driving switching preparation section.

Subsequently, the driving switching permission determination unit 13 compares the driving load at the current position calculated in step S201 with the switching determination threshold value at the current position calculated in step S202 (step S203). At this time, when the driving load is less than the switching determination threshold value (YES in step S203), switching of the subject vehicle from automatic driving to manual driving is permitted (step S204), and the driving switching propriety determination process is terminated. When the driving load is equal to or larger than the switching determination threshold value (NO in step S203), switching of the subject vehicle from automatic driving to manual driving is not permitted (step S205), and the driving switching propriety determination process is terminated.

By performing an automatic driving control planning process of FIG. 14, it is possible to shorten the length of the switching-inhibited section generated particularly in the latter half of the driving switching preparation section. Further, depending on conditions, it is possible to reduce the number of switching-inhibited sections generated in the driving switching preparation section. Therefore, a sufficient length is secured in the driving switching preparation section.

Upon completion of the automatic driving control planning process, the notification processor 22 causes the display 41 of the notification apparatus 40 to display a result of the automatic driving control planning process, that is, an image showing a current situation as to whether or not switching from automatic driving to manual driving is permitted (step S106). By displaying this image on the display 41, the notification processor 22 notifies the driver of information as to whether or not the subject vehicle can be switched to manual driving. Hereinafter, an image showing information as to whether or not the subject vehicle can be switched to manual driving is referred to as "switching propriety notification image".

Figure 15:
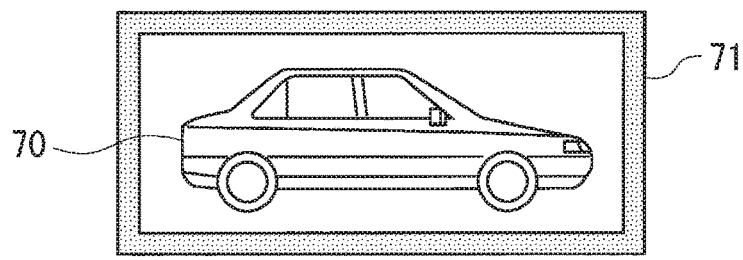
FIG. 15 is a view showing an example of a switching propriety notification image.
Figure 16:
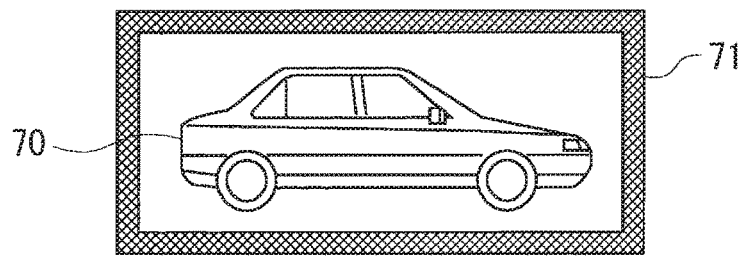
FIG. 16 is a view showing an example of the switching propriety notification image.

FIGS. 15 to 19 are views showing examples of the switching propriety notification image. For example, it is preferable that the notification processor 22 causes a part of a screen of the display 41 to display an image obtained by adding a frame image 71 to an image 70 of the subject vehicle as shown in FIG. 15 when the subject vehicle enters the driving switching preparation section, and changes a color of the frame image 71 as shown in FIG. 16 when manual driving of the subject vehicle is not permitted. For example, it is preferable to make the color of the frame image 71 blue when switching to manual driving is permitted, and to make the color of the frame image 71 red when switching to manual driving is not permitted.

Figure 17:
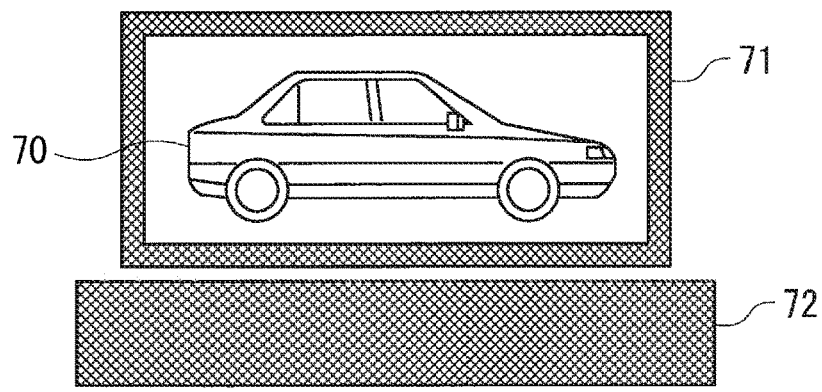
FIG. 17 is a view showing an example of the switching propriety notification image.
Figure 18:
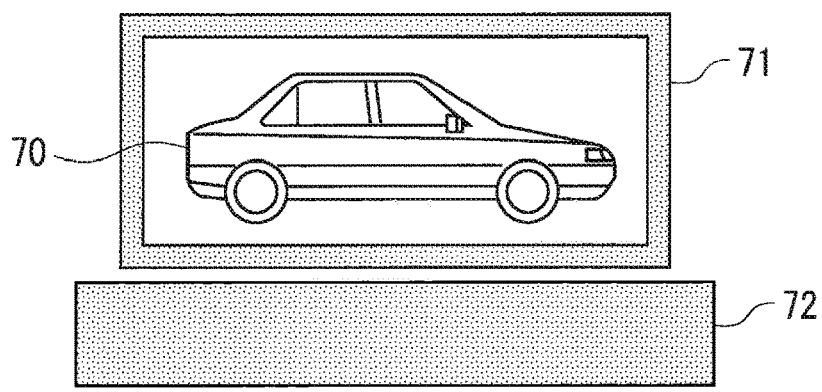
FIG. 18 is a view showing an example of the switching propriety notification image.
Figure 19:
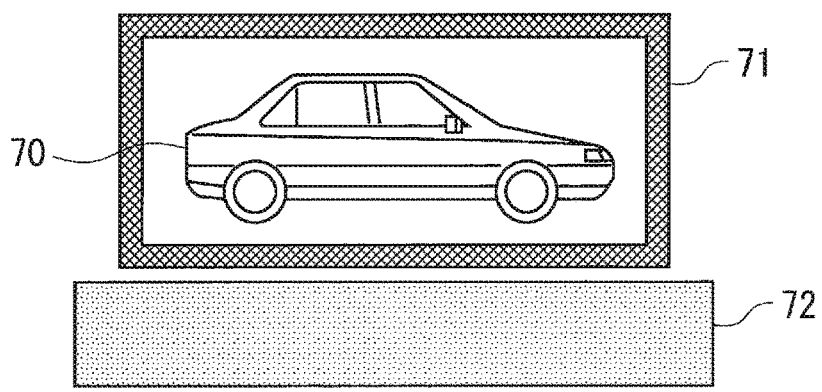
FIG. 19 is a view showing an example of the switching propriety notification image.

Further, for example, while automatic driving of the subject vehicle is being performed, the notification processor 22 may cause a part of the screen of the display 41 to display an image obtained by adding the frame image 71 and an image 72 representing a road to the image 70 of the subject vehicle, as shown in FIG. 17. In this case, when the subject vehicle enters the driving switching preparation section, it is preferable to change the colors of the frame image 71 and the image 72 representing a road as shown in FIG. 18, and further change the color of the frame image 71 as shown in FIG. 19 when manual driving of the subject vehicle is not permitted. For example, it is preferable that both the frame image 71 and the image 72 representing a road are made red before the subject vehicle enters the driving switching preparation section, and the image 72 representing a road is made blue and then the frame image 71 is made blue when switching to manual driving is permitted, and the color of the frame image 71 is made red when switching to manual driving is not permitted, after the subject vehicle enters the driving switching preparation section.

In addition, the notification processor 22 may use the sound output unit 42 of the notification apparatus 40 to notify the driver of information as to whether or not switching to manual driving is permitted. For example, it is preferable to cause the sound output unit 42 to output a voice message "Switching to manual driving has been inhibited" at a timing when switching to manual driving is no longer permitted, and to cause the sound output unit 42 to output a voice message "Switching to manual driving has become possible" at a timing when switching to manual driving has been permitted.

Returning to FIG. 13, while performing automatic driving of the subject vehicle, the travel controller 1 checks whether or not switching to manual driving of the subject vehicle is permitted, on the basis of a result of the driving switching propriety determination process (step S107). When switching to manual driving is permitted (YES in step S107), the travel controller 1 checks whether or not the driver has performed an operation for switching the subject vehicle to manual driving (hereinafter referred to as "manual driving switching operation") (step S108). As the manual driving switching operation, for example, an override operation using the manual driving apparatus 4 or the like is conceivable. However, the manual driving switching operation may be any as long as the driver can transmit the intention of switching the subject vehicle to the manual driving to the travel controller 1, and may be performed by using an operation input apparatus (not shown) other than the manual driving apparatus 4.

When the manual driving switching operation is performed while switching to manual driving is permitted (YES in step S108), the notification processor 22 uses the notification apparatus 40 to notify the driver of the end of the automatic driving (step S110), and the travel controller 1 terminates the automatic driving (step S111). As a result, driving authority of the subject vehicle is shifted from the travel controller 1 to the driver, and the driver uses the manual driving apparatus 4 to perform manual driving of the subject vehicle.

As a notification in step S110, a voice message such as "Automatic driving is to be terminated and switched to manual driving" may be outputted from the sound output unit 42, or a text message "Automatic driving is to be terminated and switched to manual driving" may be displayed on the display 41.

When switching to manual driving is not permitted (NO in step S107), and the manual driving switching operation is not performed even if switching to manual driving is permitted (NO in step S108), the travel controller 1 checks whether or not an end point of the driving switching preparation section has been reached (step S109).

When the subject vehicle has not reached the end point of the driving switching preparation section (NO in step S109), processing returns to step S105 and automatic driving of the subject vehicle is continued. When the subject vehicle has reached the end point of the driving switching preparation section (YES in step S109), the notification processor 22 uses the notification apparatus 40 to notify the driver of the end of the automatic driving (step S110), and the travel controller 1 terminates the automatic driving (step S111). As a result, driving authority of the subject vehicle is shifted from the travel controller 1 to the driver, and the driver uses the manual driving apparatus 4 to perform manual driving of the subject vehicle.

In the above description, an example is shown in which manual driving is started in step S111 when it is determined as YES in step S109, that is, even when the subject vehicle has reached the end point of the driving switching preparation section without performing the manual driving switching operation. However, in a case where the subject vehicle has reached the end point of the driving switching preparation section without performing the manual driving switching operation, it may be considered that the driver is not ready for manual driving. Therefore, in that case, the travel controller 1 may move and stop the subject vehicle at a place where the subject vehicle can be stopped, such as a shoulder of the road, by automatic driving.

Further, in the above explanation, it is assumed that the length of the driving switching preparation section is fixed, but it is also possible to allow the driver to change the start point of the driving switching preparation section such that the driving switching preparation section starts earlier. For example, if the driver performs a specific operation to request switching to manual driving before the subject vehicle enters the driving switching preparation section, the driving switching preparation section may be started from that point. In other words, the current position of the subject vehicle when the driver requests switching to manual driving may be set as the start point of the driving switching preparation section.

Meanwhile, when the driver changes the start point of the driving switching preparation section, and consequently the length of the driving switching preparation section becomes longer than sufficient, it is considered that there is no problem even if the substantial length of the driving switching preparation section becomes shorter to an extent. Therefore, when the length of the driving switching preparation section becomes longer than a predetermined threshold value, the permission standard relaxation unit 14 may not relax the standard for permitting switching to manual driving (may make the switching determination threshold value constant) for such a driving switching preparation section.

FIGS. 20 and 21 each are diagrams showing an example of a hardware configuration of the automatic driving control planning apparatus 10. Each element of the automatic driving control planning apparatus 10 shown in FIG. 1 (the automatic driving control plan creation unit 11, the driving load calculation unit 12, the driving switching permission determination unit 13, and the permission standard relaxation unit 14) is realized, for example, by a processing circuit 50 shown in FIG. 20. That is, the processing circuit 50 includes: the automatic driving control plan creation unit 11 that creates an automatic driving control plan including a plan of the automatic driving section and a plan of the driving switching preparation section; the driving load calculation unit 12 that calculates, for each point of the driving switching preparation section, a driving load applied to a driver when the driver manually drives the subject vehicle; the driving switching permission determination unit 13 that permits switching of the subject vehicle from automatic driving to manual driving at a point where the driving load calculated by the driving load calculation unit 12 is smaller than a predetermined threshold value, and does not permit switching of the subject vehicle from automatic driving to manual driving at a point where the driving load is equal to or larger than the threshold value; and the permission standard relaxation unit 14 that relaxes a standard for permitting switching of the subject vehicle from automatic driving to manual driving as the subject vehicle approaches an end point of the driving switching preparation section, by making the driving load difficult to exceed the threshold value. To the processing circuit 50, dedicated hardware may be applied, or a processor (central processing unit (CPU), a central processing device, a processing device, an arithmetic unit, a microprocessor, a microcomputer, or a digital signal processor (DSP)) that executes a program stored in a memory may be applied.

In a case where the processing circuit 50 is dedicated hardware, the processing circuit 50 corresponds to, for example, a single circuit, a composite circuit, a programmed processor, a parallel-programmed processor, an application specific integrated circuit (ASIC), a field-programmable gate array (FPGA), or a combination thereof. Each function of each element of the automatic driving control planning apparatus 10 may be realized by a plurality of processing circuits, or these functions may be collectively realized by one processing circuit.

FIG. 21 shows a hardware configuration of the automatic driving control planning apparatus 10 in a case where the processing circuit 50 is configured using the processor 51. In this case, the function of each element of the automatic driving control planning apparatus 10 is realized by a combination with software or the like (software, firmware, or software and firmware). The software or the like is described as a program and stored in a memory 52. The processor 51 as the processing circuit 50 reads out and executes the program stored in the memory 52, thereby realizing the function of each part. That is, the automatic driving control planning apparatus 10 includes the memory 52 to store a program that consequently causes, when executed by the processing circuit 50, execution of: a process of creating an automatic driving control plan including a plan of the automatic driving section and a plan of the driving switching preparation section; a process of calculating a driving load applied to a driver when the driver manually drives the subject vehicle, for each point of the driving switching preparation section; a process of permitting switching of the subject vehicle from automatic driving to manual driving at a point where a driving load is smaller than a predetermined threshold value, and not permitting switching of the subject vehicle from automatic driving to manual driving at a point where the driving load is equal to or larger than the threshold value; and a process of relaxing a standard for permitting switching of the subject vehicle from automatic driving to manual driving as the subject vehicle approaches an end point of the driving switching preparation section, by making the driving load difficult to exceed the threshold value. In other words, this program can also be said to cause a computer to execute a procedure and a method of an operation of each element of the automatic driving control planning apparatus 10.

Here, the memory 52 may be, for example, a non-volatile or volatile semiconductor memory such as a random access memory (RAM), a read only memory (ROM), a flash memory, an erasable programmable read only memory (EPROM), or an electrically erasable programmable read only memory (EEPROM), a hard disk drive (HDD), a magnetic disk, a flexible disk, an optical disk, a compact disk, a mini disk, a digital versatile disc (DVD), drive apparatus thereof, and the like, or may be any storage medium to be used in the future.

As described above, the configuration has been described in which the function of each element of the automatic driving control planning apparatus 10 is realized by one of the hardware and the software or the like. However, the present invention is not limited to this, and a part of the elements of the automatic driving control planning apparatus 10 may be realized by dedicated hardware, and another part of elements may be realized by software or the like. For example, for a part of the elements, the function can be realized by the processing circuit 50 as dedicated hardware, and for another part of elements, the function can be realized by reading out and executing the program stored in the memory 52 with the processing circuit 50 as the processor 51.

As described above, the automatic driving control planning apparatus 10 can realize the above-described functions by hardware, software or the like, or a combination thereof.

Second Embodiment

In the first embodiment, the driving load calculation unit 12 and the driving switching permission determination unit 13 are configured to determine a current situation as to whether or not switching from automatic driving to manual driving of the subject vehicle is permitted. However, since the driving load at each point can be predicted in advance, a position of a section (switching-inhibited section) where switching from automatic driving to manual driving is not permitted can be predicted in advance. For example, a prediction value of the driving loads W1 to W3 at each point shown in FIGS. 2 to 4 can be calculated from a road shape included in map information, a prediction value of a traveling speed of the subject vehicle, and the like.

Therefore, in the second embodiment, a driving load calculation unit 12 previously predicts and calculates the driving load at each point in a driving switching preparation section. Further, a driving switching permission determination unit 13 extracts in advance, from the driving switching preparation section, the switching-inhibited section on the basis of the driving load at each point predicted by the driving load calculation unit 12. Note that a configuration of the vehicle control system of the second embodiment is similar to that of the first embodiment (FIG. 1).

The driving switching permission determination unit 13 extracts, as the switching-inhibited section, a section including a point where the driving load predicted by the driving load calculation unit 12 exceeds a switching determination threshold value. For example, it is conceivable that a section of 30 m before and after a point where the driving load exceeds the switching determination threshold value is set as the switching-inhibited section. Alternatively, the driving switching preparation section may be sectioned into a plurality of sections at intervals of about 50 m, a driving load of each section may be defined as a maximum value of the driving load at the point belonging to that section, and a section where the driving load exceeds the switching determination threshold value may be set as the switching-inhibited section.

Note that, in the second embodiment as well, a permission standard relaxation unit 14 relaxes a standard for permitting switching of the subject vehicle to manual driving by increasing the switching determination threshold value as the subject vehicle approaches the end point of the driving switching preparation section.

Figure 22:
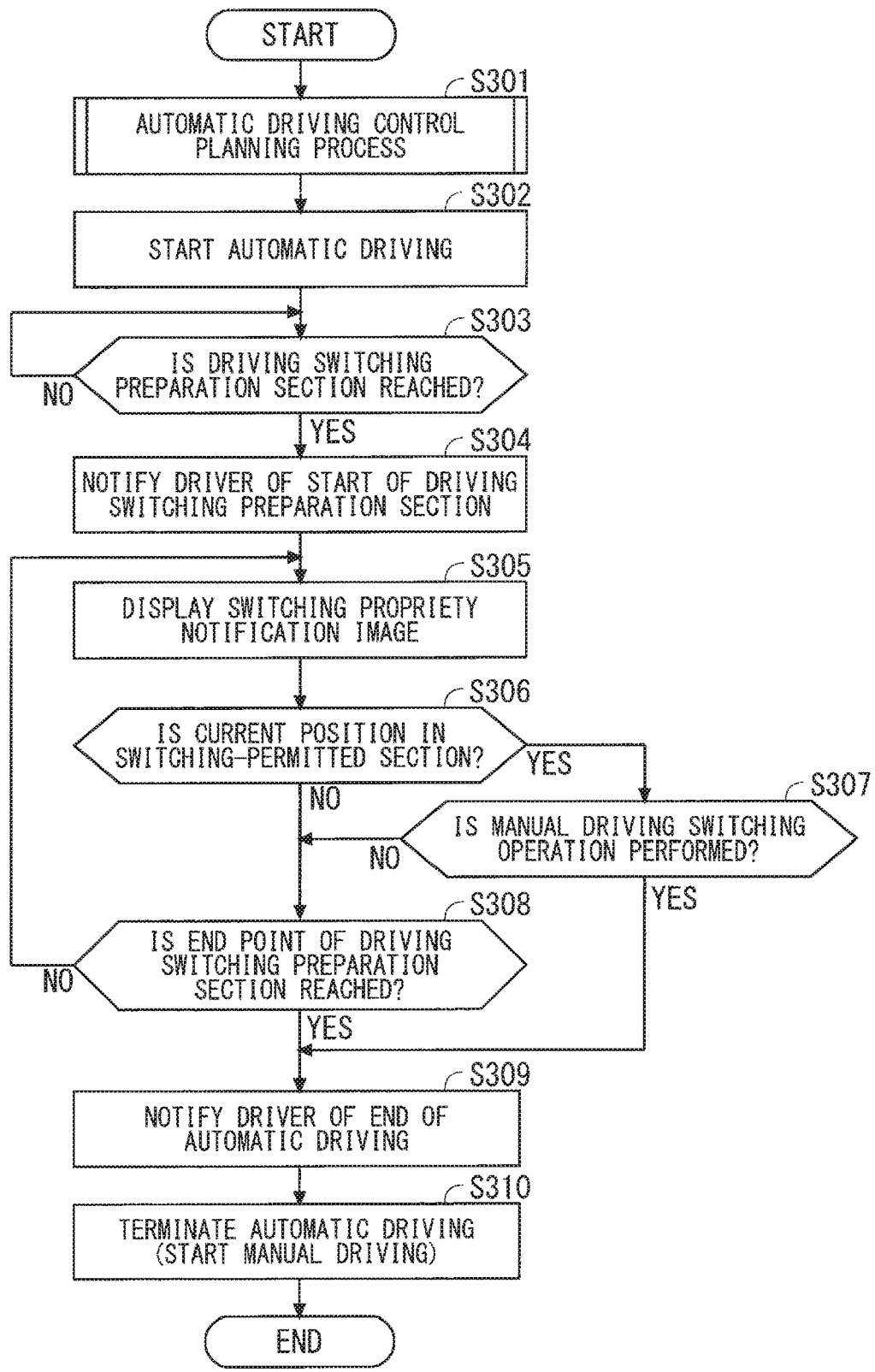
FIG. 22 is a flowchart showing an operation of a vehicle control system according to a second embodiment.
Figure 23:
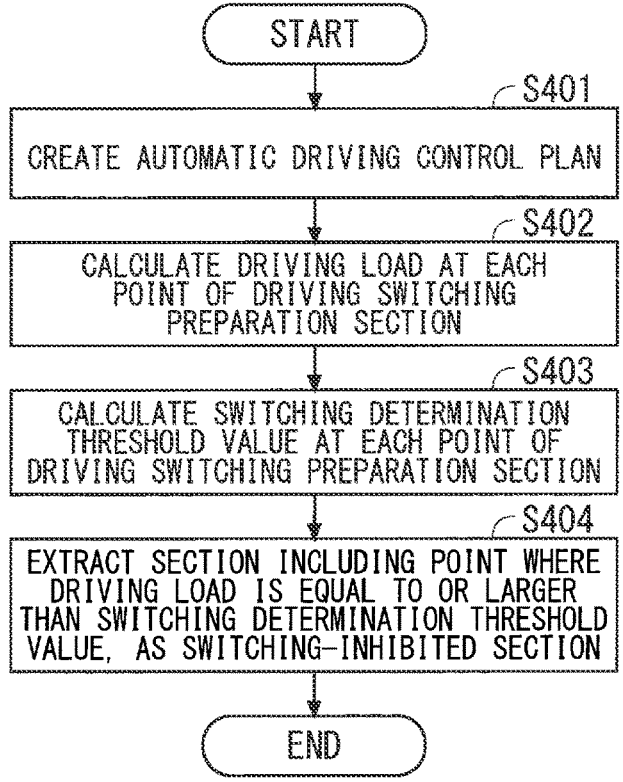
FIG. 23 is a flowchart showing an automatic driving control planning process according to the second embodiment.

FIG. 22 is a flowchart showing an operation of the vehicle control system according to the first embodiment. Further, FIG. 23 is a flowchart showing an "automatic driving control planning process" (step S301) in the flow of FIG. 22. Hereinafter, an operation of the vehicle control system according to the first embodiment will be described with reference to FIGS. 22 and 23. Note that the flow of FIG. 22 is executed when automatic driving of the subject vehicle is performed.

When the driver performs an operation for performing automatic driving of the subject vehicle, an automatic driving control planning apparatus 10 executes the "automatic driving control planning process" that is a process for developing an automatic driving plan (step S301).

In the automatic driving control planning process, the flow shown in FIG. 23 is executed in the automatic driving control planning apparatus 10. First, the automatic driving control plan creation unit 11 creates an automatic driving control plan on the basis of a planned traveling route of the subject vehicle and map information acquired from the map information storage 21 (step S401). The automatic driving control plan includes a plan of the automatic driving section and a plan of the driving switching preparation section.

Next, the driving load calculation unit 12 calculates a driving load when the driver manually drives the subject vehicle, for each point of the driving switching preparation section planned in step S401 (step S402). Subsequently, the permission standard relaxation unit 14 calculates a switching determination threshold value for each point of the driving switching preparation section (step S403). At this time, the permission standard relaxation unit 14 increases the switching determination threshold value as the point is closer to the end point of the driving switching preparation section.

Then, the driving switching permission determination unit 13 extracts, as a switching-inhibited section, a section where the driving load is equal to or larger than the switching determination threshold value, on the basis of the driving load at each point calculated in step S402 and the switching determination threshold value at each point calculated in step S403 (step S404), and the automatic driving control planning process is terminated.

In the above step S403, by increasing the switching determination threshold value as the point is closer to the end point of the driving switching preparation section, the permission standard relaxation unit 14 can shorten the length of the switching-inhibited section generated particularly in the latter half of the driving switching preparation section. Therefore, the substantial length of the driving switching preparation section is sufficiently secured.

Returning to FIG. 22, when the automatic driving control planning process of step S301 is completed, the travel controller 1 starts automatic driving of the subject vehicle (step S302). That is, driving authority of the subject vehicle is shifted from the driver to the travel controller 1, and the travel controller 1 performs automatic control of the braking/driving mechanism 2 and the steering mechanism 3, on the basis of the automatic driving control plan developed in step S301 and peripheral information acquired by the peripheral information detector 30.

While automatic driving of the subject vehicle is being performed, the notification processor 22 checks whether or not the subject vehicle has reached the driving switching preparation section, on the basis of a current position of the subject vehicle acquired by the position information acquisition apparatus 20 and map information stored in the map information storage 21 (step S303). The notification processor 22 waits until the subject vehicle reaches the driving switching preparation section (NO in step S303).

When the subject vehicle reaches the driving switching preparation section (YES in step S303), the notification processor 22 uses the notification apparatus 40 to notify the driver of a start of the driving switching preparation section (step S304). As a specific example of the notification in step S304, for example, it is conceivable that the notification processor 22 causes the sound output unit 42 of the notification apparatus 40 to output a voice message "Entered the driving switching preparation section", for example, at a timing when the subject vehicle enters the driving switching preparation section.

The notification of step S304 may be performed before the timing of entering the driving switching preparation section. For example, at a timing one minute before the subject vehicle enters the driving switching preparation section, the notification processor 22 may cause the sound output unit 42 of the notification apparatus 40 to output a voice message "Entering the driving switching preparation section in one minute".

After the subject vehicle reaches the driving switching preparation section, the notification processor 22 causes the display 41 of the notification apparatus 40 to display a switching propriety notification image showing information as to whether or not the subject vehicle can be switched to manual driving (step S305). Here, as the switching propriety notification image, an image showing a positional relationship between the subject vehicle and the switching-inhibited section is used. By causing the display 41 to display the switching propriety notification image, the notification processor 22 notifies the driver of information as to whether or not the subject vehicle is located in the switching-inhibited section, that is, information as to whether or not the subject vehicle can be switched to manual driving.

Figure 24:
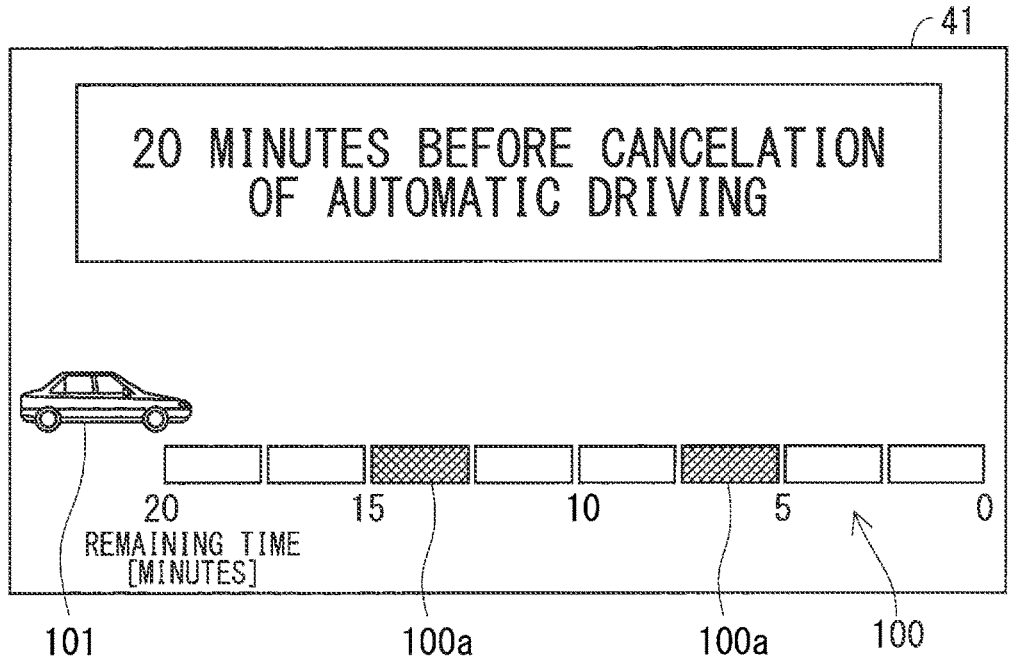
FIG. 24 is a view showing an example of the switching propriety notification image.
Figure 25:
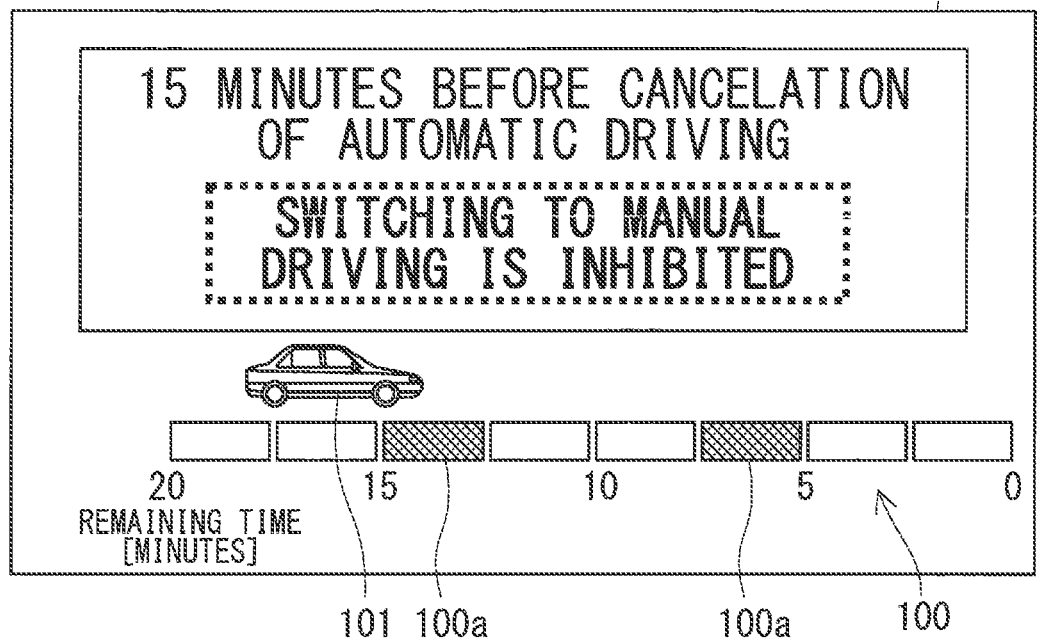
FIG. 25 is a view showing an example of the switching propriety notification image.

FIGS. 24 and 25 are views showing examples of the switching propriety notification image. For example, in a case where the start point of the driving switching preparation section is defined as a point 20 minutes before reaching the end point of the automatic driving section, when the subject vehicle enters the driving switching preparation section, the notification processor 22 causes the display 41 of the notification apparatus 40 to display the switching propriety notification image as shown in FIG. 24. The switching propriety notification image in FIG. 24 is an image obtained by synthesizing a subject vehicle position mark 101 that is an image showing a position of the subject vehicle, on a section display bar 100 that is an image linearly representing the driving switching preparation section including the switching-inhibited section. The section display bar 100 includes a switching-inhibited section mark 100a indicating a position corresponding to the switching-inhibited section. In addition, the switching propriety notification image in FIG. 24 also shows a remaining time until the automatic driving is canceled (remaining time until the subject vehicle reaches the end point of the driving switching preparation section).

When the subject vehicle travels from the state of FIG. 24, the notification processor 22 changes a display position of the subject vehicle position mark 101 in the switching propriety notification image in accordance with a change in the position of the subject vehicle. When the subject vehicle enters the switching-inhibited section, the notification processor 22 adds a text message "Switching to manual driving is inhibited" to the switching propriety notification image, as shown in FIG. 25.

In addition, the notification processor 22 may use the sound output unit 42 of the notification apparatus 40 to notify the driver of information as to whether or not the subject vehicle is located in the switching-inhibited section. For example, it is preferable to cause the sound output unit 42 to output a voice message "Switching of manual driving has been inhibited" at a timing when the subject vehicle enters the switching-inhibited section, and causes the sound output unit 42 to output a voice message "Switching of manual driving has become possible" at a timing of exiting from the switching-inhibited section.

Returning to FIG. 22, while performing automatic driving of the subject vehicle, the travel controller 1 checks whether or not the current position of the subject vehicle is in the switching-permitted section (step S306). When the current position of the subject vehicle is in the switching-permitted section (YES in step S306), the travel controller 1 checks whether or not the driver has performed an operation for switching the subject vehicle to manual driving (hereinafter referred to as "manual driving switching operation") (step S307). As the manual driving switching operation, for example, an override operation using the manual driving apparatus 4 or the like is conceivable. However, the manual driving switching operation may be any as long as the driver can transmit the intention of switching the subject vehicle to the manual driving to the travel controller 1, and may be performed by using an operation input apparatus (not shown) other than the manual driving apparatus 4.

If the manual driving switching operation is performed while the subject vehicle is traveling in the switching-permitted section (YES in step S307), the notification processor 22 uses the notification apparatus 40 to notify the driver of the end of the automatic driving (step S309), and the travel controller 1 terminates the automatic driving (step S310). As a result, driving authority of the subject vehicle is shifted from the travel controller 1 to the driver, and the driver uses the manual driving apparatus 4 to perform manual driving of the subject vehicle.

Figure 26:
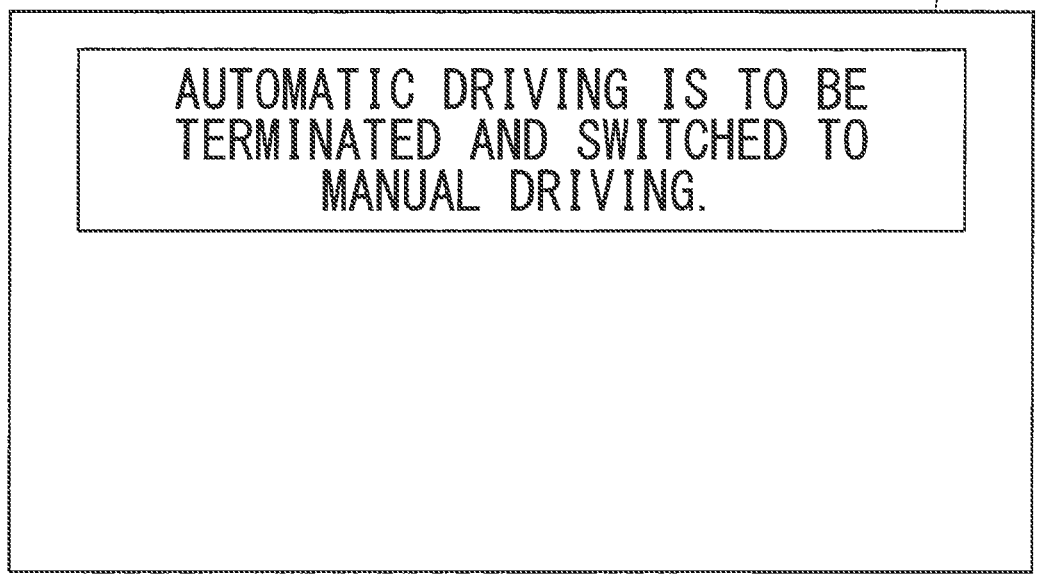
FIG. 26 is a view showing an example of an image displayed on the display of the notification apparatus at the end of the automatic driving.

The notification in step S309 may be a voice message such as "Automatic driving is to be terminated and switched to manual driving", or as shown in FIG. 26, a text message "Automatic driving is to be terminated and switched to manual driving" may be displayed on the display 41.

When the subject vehicle is traveling in the switching-inhibited section (NO in step S306), and when the manual driving switching operation is not performed even while the subject vehicle is traveling in the switching-permitted section (NO in step S307), the travel controller 1 checks whether or not the end point of the driving switching preparation section has been reached (step S308).

When the subject vehicle has not reached the end point of the driving switching preparation section (NO in step S308), processing returns to step S305 and automatic driving of the subject vehicle is continued. When the subject vehicle has reached the end point of the driving switching preparation section (YES in step S308), the notification processor 22 uses the notification apparatus 40 to notify the driver of the end of the automatic driving (step S309), and the travel controller 1 terminates the automatic driving (step S310). As a result, driving authority of the subject vehicle is shifted from the travel controller 1 to the driver, and the driver uses the manual driving apparatus 4 to perform manual driving of the subject vehicle.

In the above description, an example is shown in which manual driving is started in step S310 when it is determined as YES in step S308, that is, even when the subject vehicle has reached the end point of the driving switching preparation section without performing the manual driving switching operation. However, in a case where the subject vehicle has reached the end point of the driving switching preparation section without performing the manual driving switching operation, it may be considered that the driver is not ready for manual driving. Therefore, in that case, the travel controller 1 may move and stop the subject vehicle at a place where the subject vehicle can be stopped, such as a shoulder of the road, by automatic driving.

Figure 27:
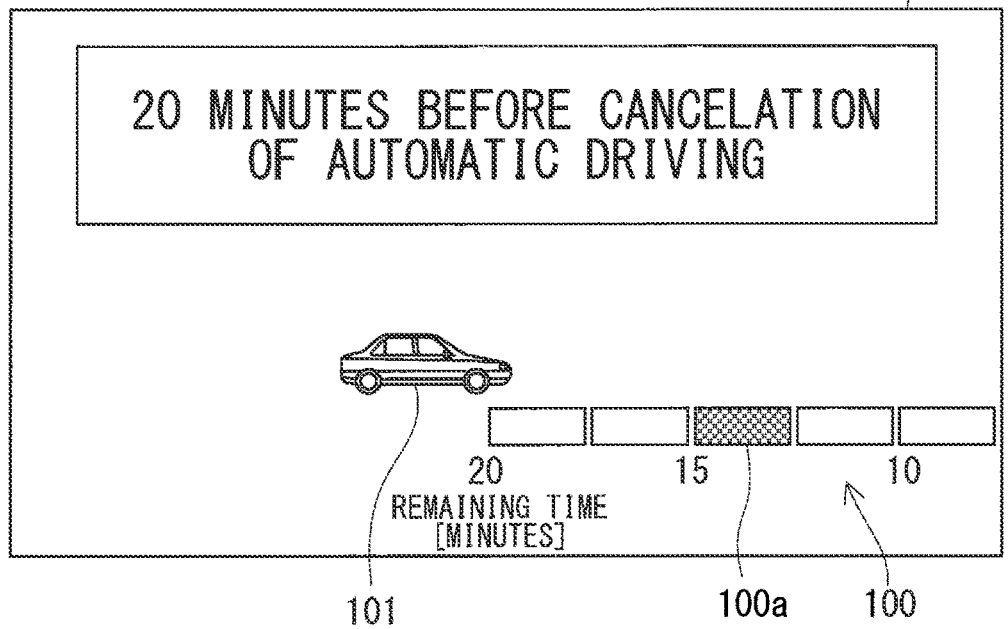
FIG. 27 is a view showing an example of the switching propriety notification image.
Figure 28:
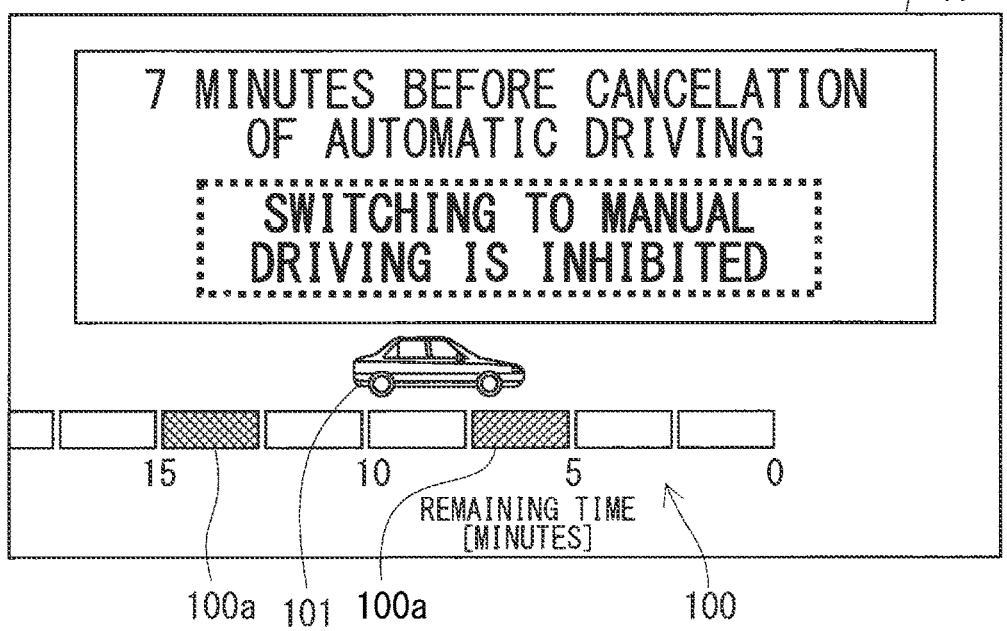
FIG. 28 is a view showing an example of the switching propriety notification image.

Here, some modifications of the switching propriety notification image shown in FIGS. 24 and 25 are shown. FIGS. 24 and 25 show an example in which, on the screen of the display 41, a display position of the section display bar 100 is fixed at a fixed position, and the display position of the subject vehicle position mark 101 is moved in accordance with a change in the current position of the subject vehicle. However, as shown in FIGS. 27 and 28, the display position of the subject vehicle position mark 101 may be fixed at a fixed position, and the section display bar 100 may be scrolled in accordance with a change of the current position of the subject vehicle.

Figure 29:
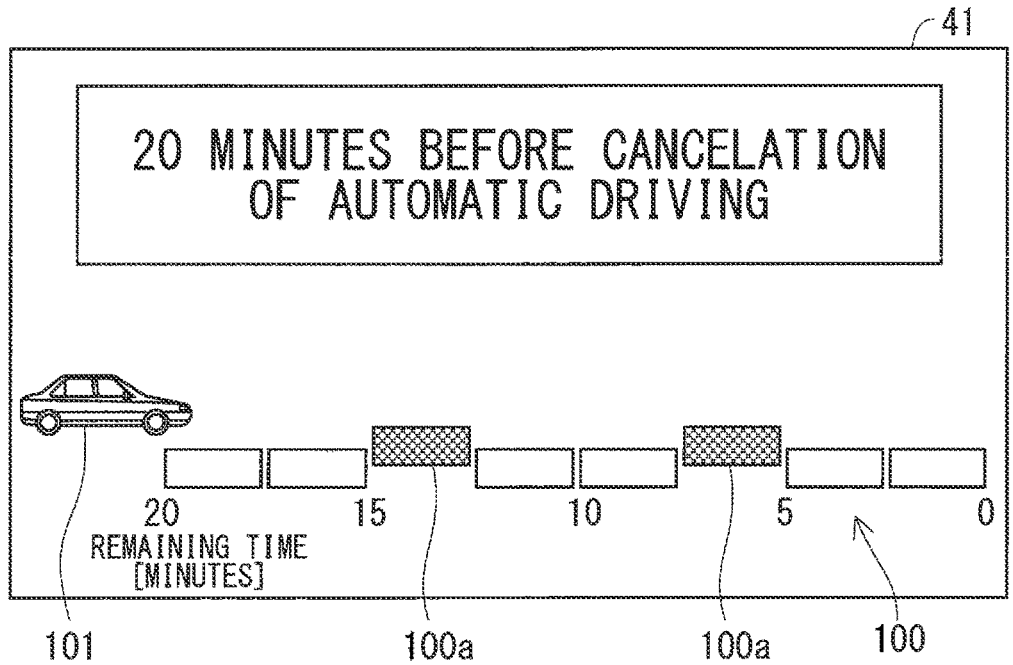
FIG. 29 is a view showing an example of the switching propriety notification image.
Figure 30:
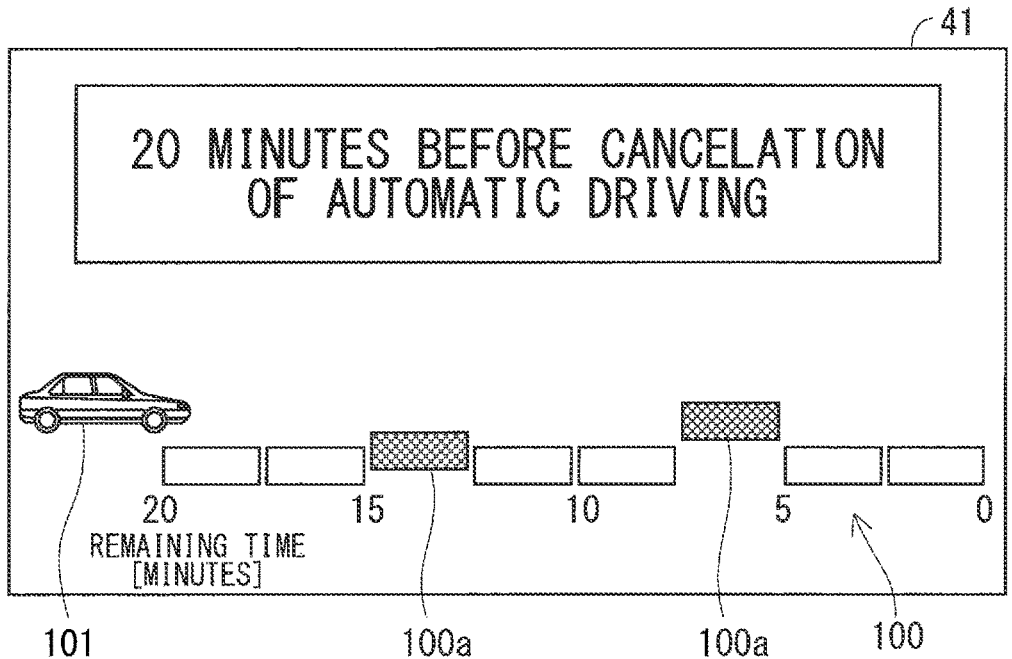
FIG. 30 is a view showing an example of the switching propriety notification image.

Further, as shown in FIG. 29, a display position of the switching-inhibited section mark 100a may be shifted upward from the display position of the section display bar 100 to improve visibility of the switching-inhibited section mark 100a. Further, as shown in FIG. 30, a height of the display position of the switching-inhibited section mark 100a may express a level of the driving load of a section indicated by the switching-inhibited section mark 100a.

Figure 31:
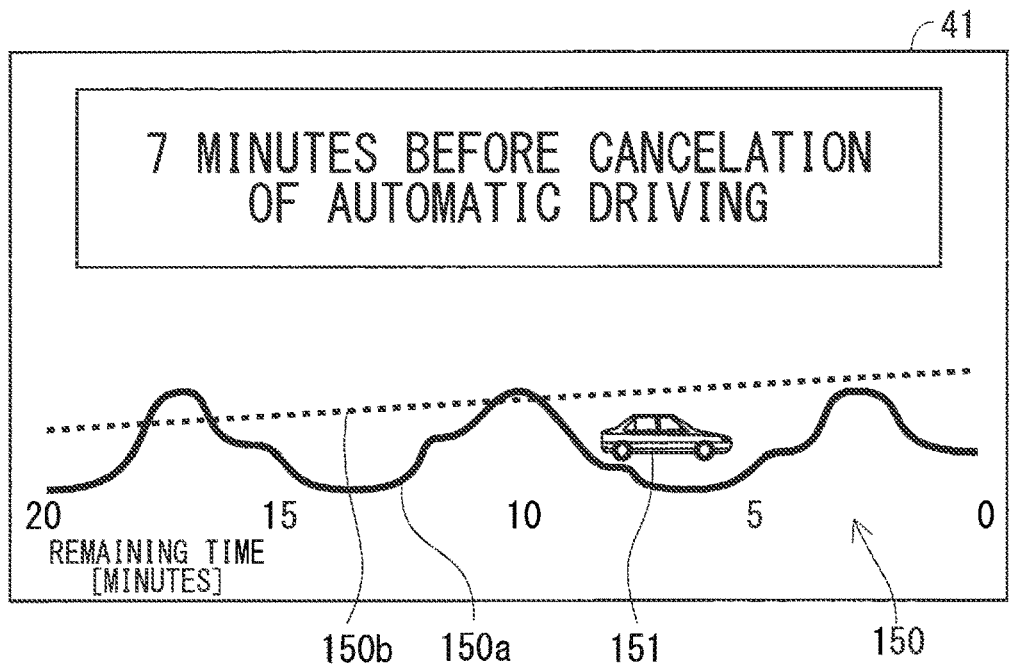
FIG. 31 is a view showing an example of the switching propriety notification image.
Figure 32:
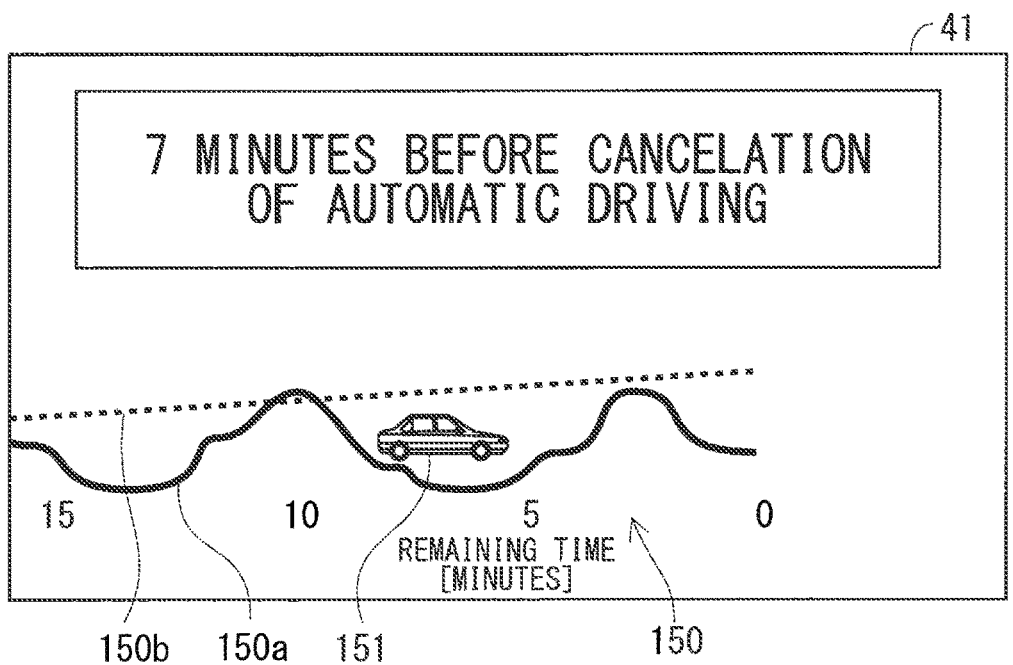
FIG. 32 is a view showing an example of the switching propriety notification image.

Further, as shown in FIG. 31, the switching propriety notification image to be displayed on the display 41 may be an image obtained by synthesizing a subject vehicle position mark 151 indicating a position of the subject vehicle on a graph image 150 including a graph 150a representing a driving load at each point in the switching-inhibited section and a graph 150b representing a switching determination threshold value at each point. FIG. 31 shows an example in which a display position of the graph image 150 is fixed at a fixed position, and a display position of the subject vehicle position mark 151 is moved in accordance with a change in the current position of the subject vehicle. However, as shown in FIG. 32, a display position of the subject vehicle position mark 151 may be fixed at a fixed position, and the graph image 150 may be scrolled in accordance with a change of the current position of the subject vehicle.

Figure 33:
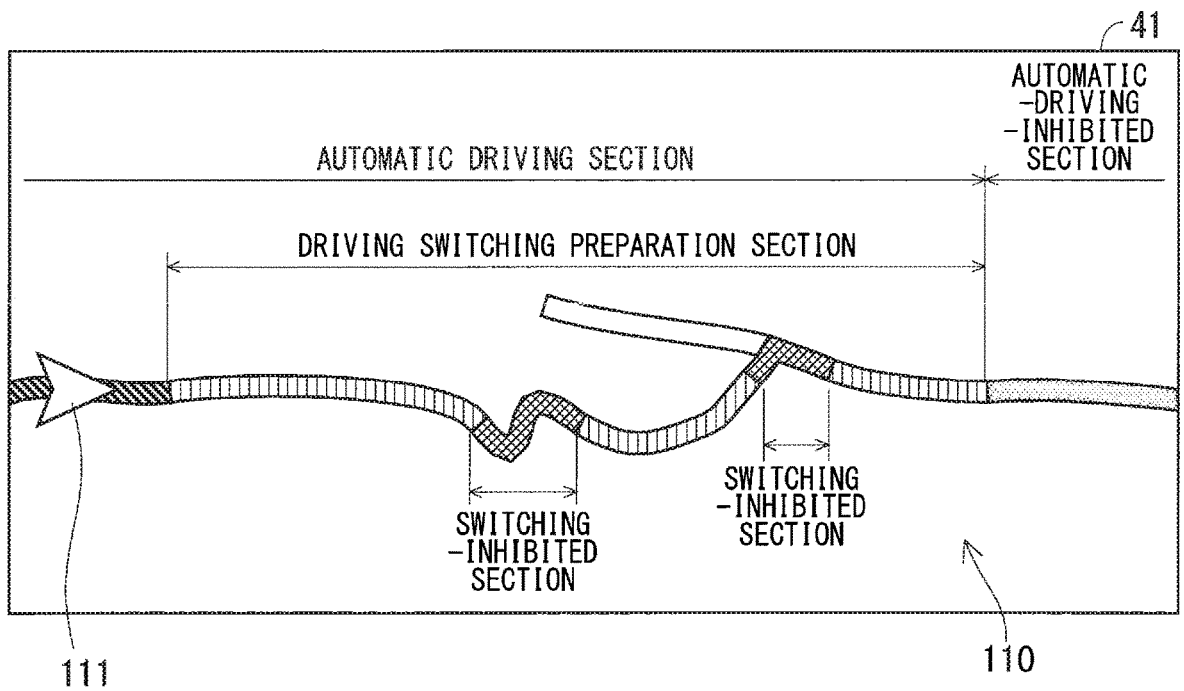
FIG. 33 is a view showing an example of the switching propriety notification image.

Further, as shown in FIG. 33, the switching propriety notification image to be displayed on the display 41 may be an image 110 of a map (hereinafter referred to as "map image 110") showing a position of the subject vehicle and a position of the switching-inhibited section. In the map image 110 of FIG. 33, the position of the subject vehicle is indicated by a subject vehicle position mark 111. Further, in the map image 110, the automatic driving section, the switching-permitted section and the switching-inhibited section of the driving switching preparation section, and an automatic-driving-inhibited section are displayed in different colors, thereby indicating the position of the automatic driving section.

Figure 34:
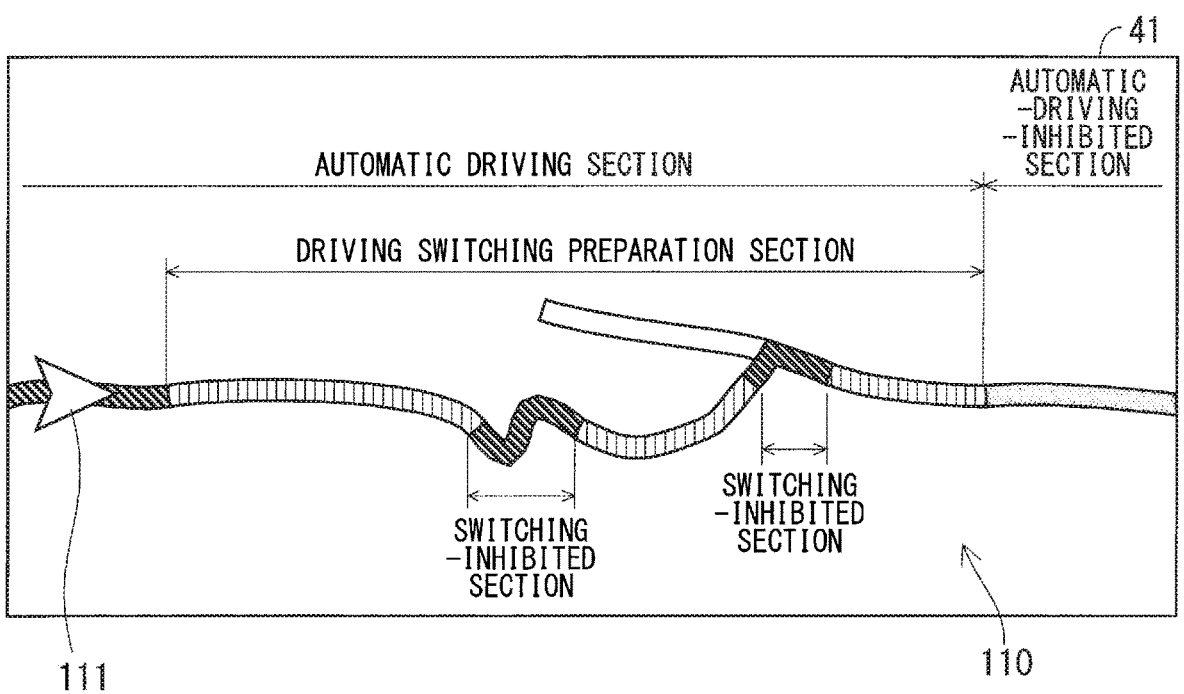
FIG. 34 is a view showing an example of the switching propriety notification image.
Figure 35:
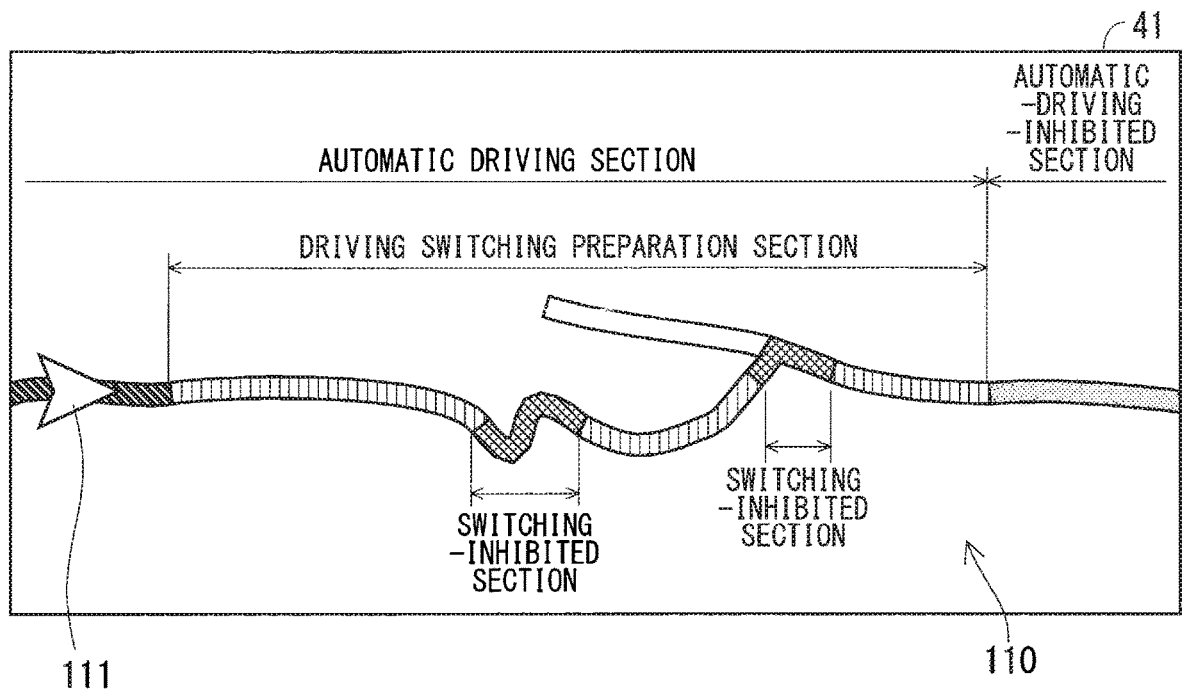
FIG. 35 is a view showing an example of the switching propriety notification image.
Figure 36:
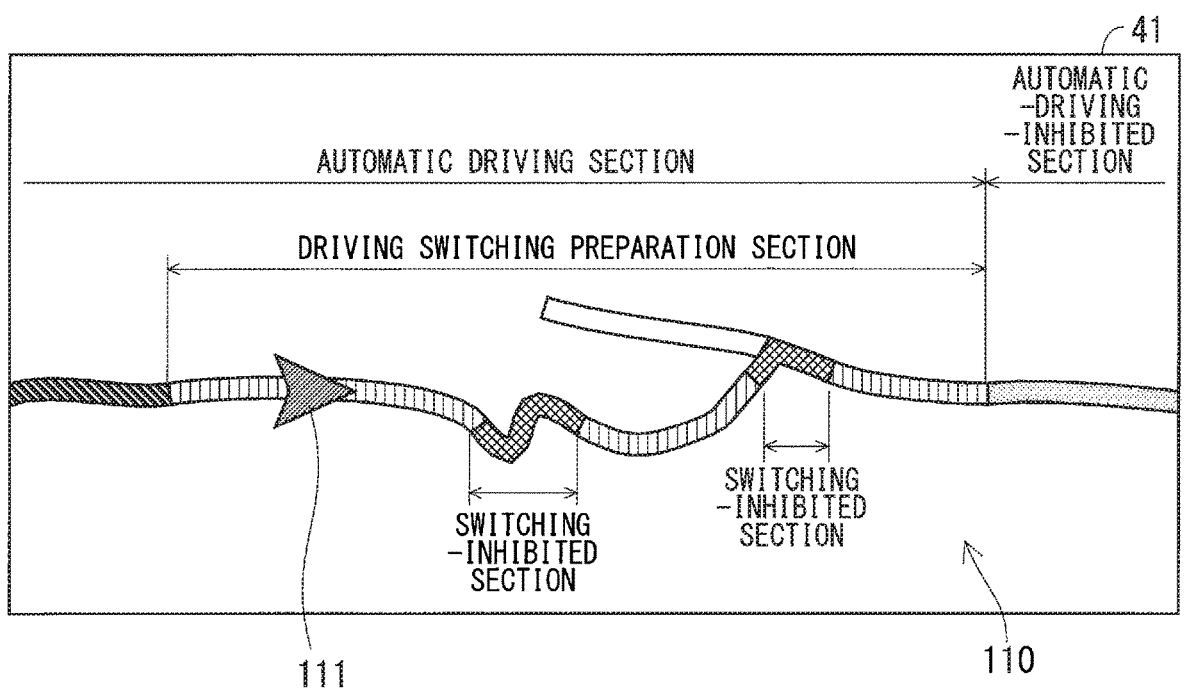
FIG. 36 is a view showing an example of the switching propriety notification image.
Figure 37:
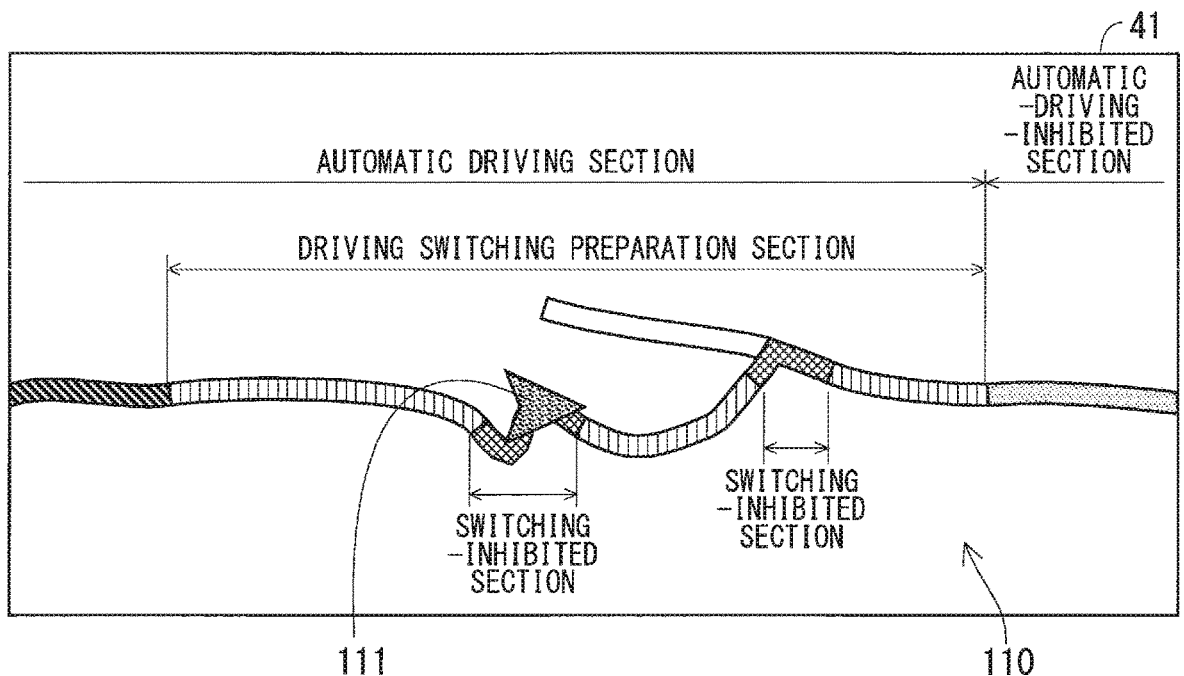
FIG. 37 is a view showing an example of the switching propriety notification image.
Figure 38:
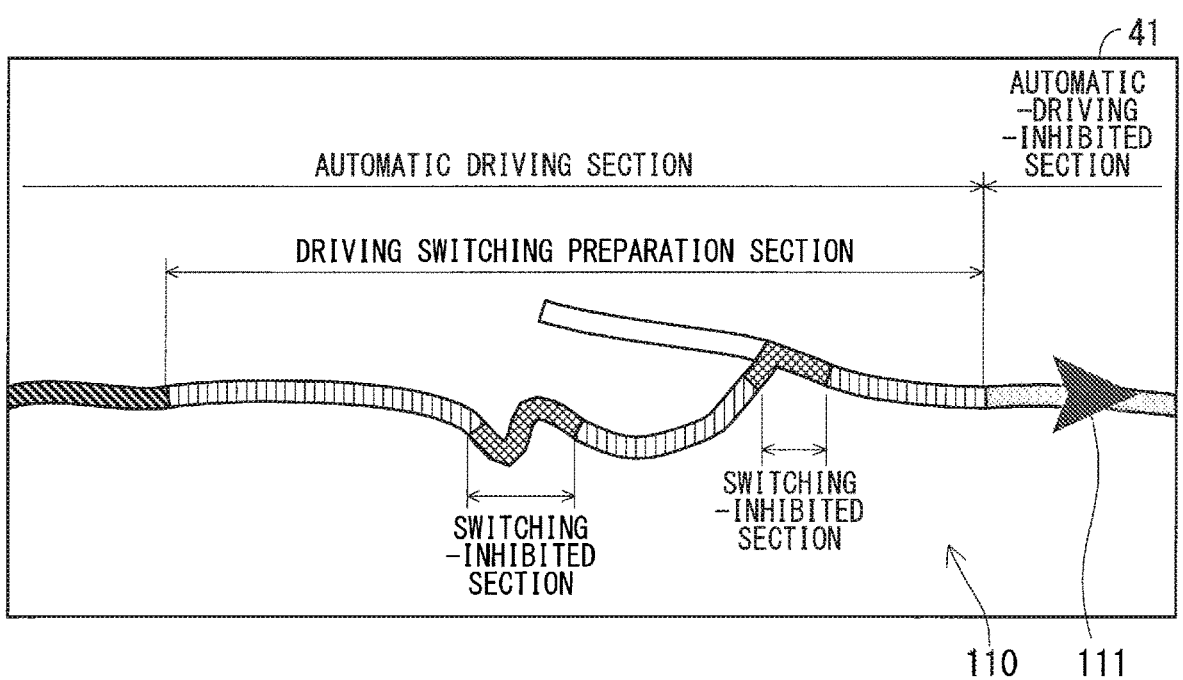
FIG. 38 is a view showing an example of the switching propriety notification image.

In the map image 110 of FIG. 33, an example is shown in which the automatic driving section, the switching-permitted section, the switching-inhibited section, and the automatic-driving-inhibited section are all displayed in different colors. However, the switching-inhibited section is the same as the normal automatic driving section (the section excluding the driving switching preparation section in the automatic driving section) in that switching from automatic driving to manual driving is not permitted, so that the color of the switching-inhibited section may be the same color as that of the normal automatic driving section, as shown in FIG. 34.

Figure 39:
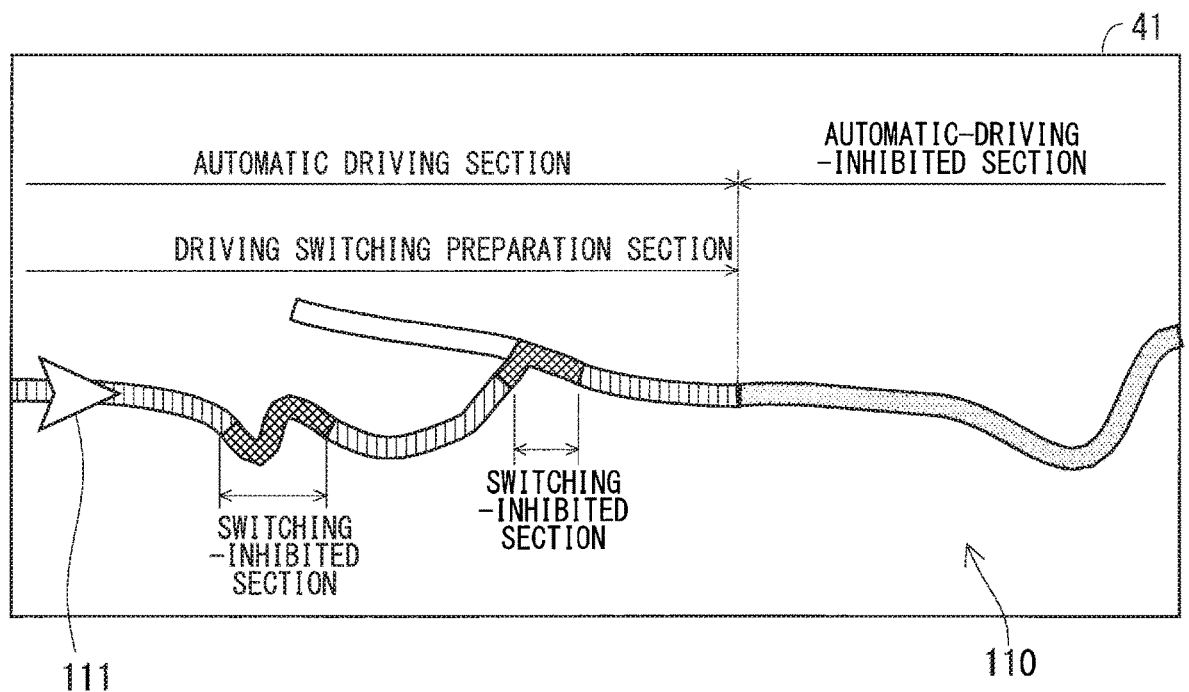
FIG. 39 is a view showing an example of the switching propriety notification image.

Further, as shown in FIGS. 35 to 38, a color of the subject vehicle position mark 111 may be changed when the subject vehicle is: located in the automatic driving section; located in the switching-permitted section; located in the switching-inhibited section; and located in the automatic-driving-inhibited section. FIGS. 35 to 38 show an example in which, on the screen of the display 41, a display position of the map image 110 is fixed at a fixed position, and a display position of the subject vehicle position mark 111 is moved in accordance with a change in the current position of the subject vehicle. However, as shown in FIG. 39, the display position of the subject vehicle position mark 111 may be fixed at a fixed position, and the map image 110 may be scrolled in accordance with a change of the current position of the subject vehicle. Further, instead of the image showing the positional relationship between the subject vehicle and the switching-inhibited section, only an image obtained by adding the frame image 71 to the image 70 of the subject vehicle as shown in FIG. 15 may be displayed, as in the first embodiment.

Third Embodiment

Figure 40:
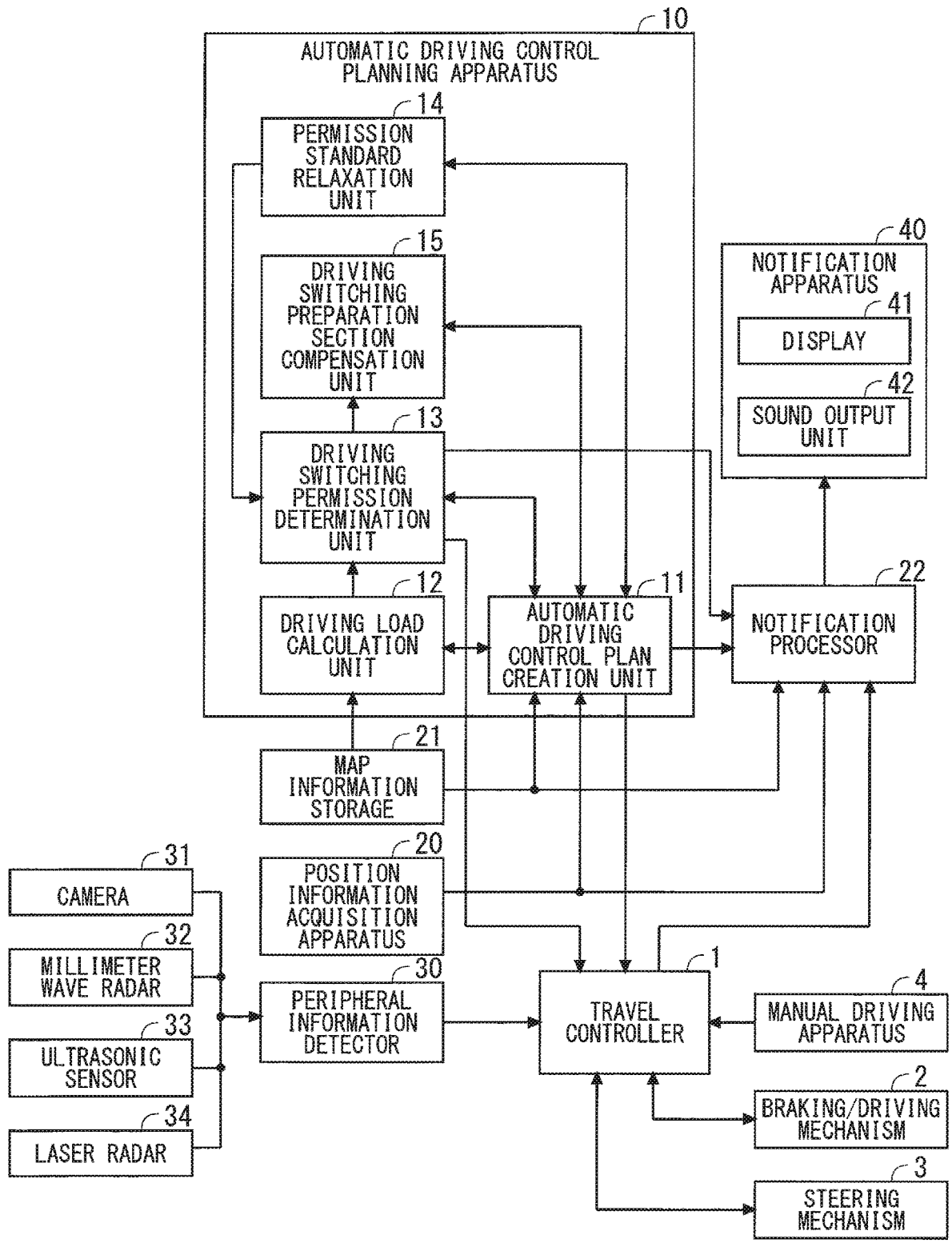
FIG. 40 is a block diagram showing a configuration of a vehicle control system according to a third embodiment.

FIG. 40 is a block diagram showing a configuration of a vehicle control system according to a third embodiment of the present invention. The configuration of the vehicle control system in FIG. 40 is a configuration in which a driving switching preparation section compensation unit 15 is added to the configuration in FIG. 1. Note that, in the third embodiment, similarly to the second embodiment, a driving load calculation unit 12 previously predicts and calculates a driving load at each point in a driving switching preparation section. Further, a driving switching permission determination unit 13 extracts in advance, from the driving switching preparation section, the switching-inhibited section on the basis of the driving load at each point predicted by the driving load calculation unit 12.

When there is a switching-inhibited section in the driving switching preparation section, the driving switching preparation section compensation unit 15 changes a start point of the driving switching preparation section so as to lengthen the driving switching preparation section in accordance with a length of the switching-inhibited section.

Figure 41:
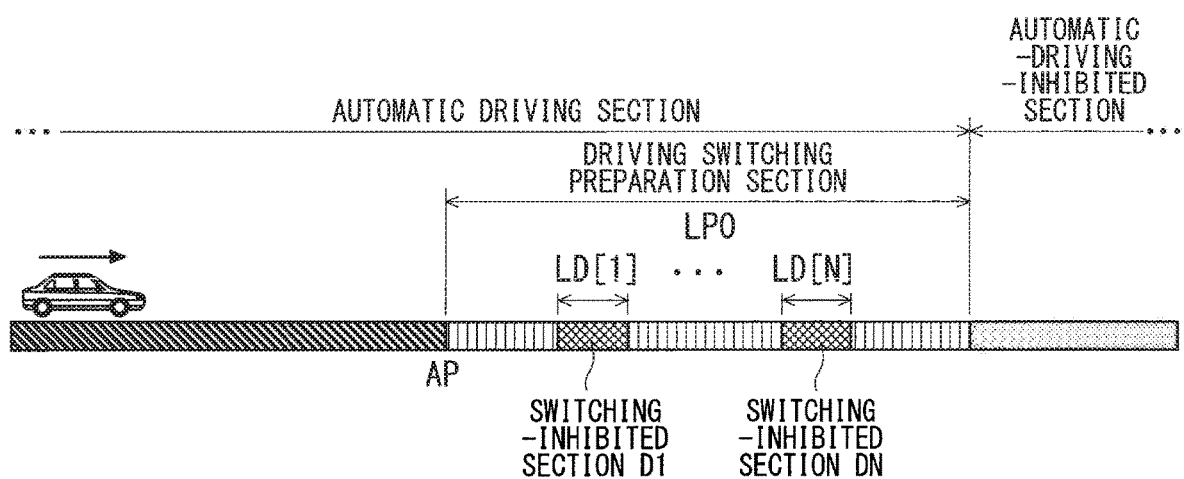
FIG. 41 is a view for explaining an operation of a driving switching preparation section compensation unit.
Figure 42:
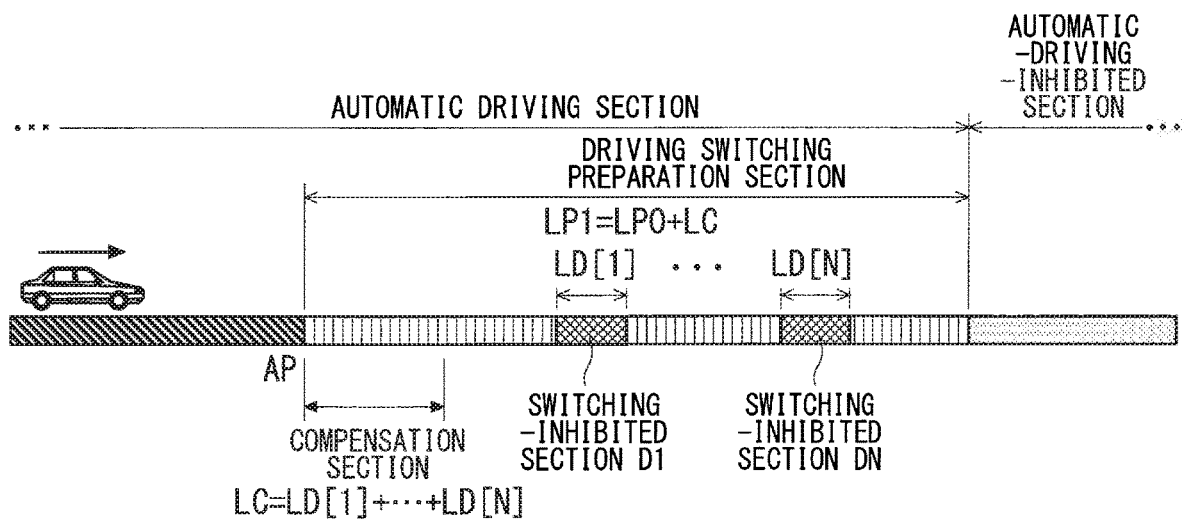
FIG. 42 is a view for explaining an operation of the driving switching preparation section compensation unit.

FIGS. 41 and 42 are views schematically showing an operation of this driving switching preparation section compensation unit 15. For example, it is assumed that a driving switching permission determination unit 13 extracts N pieces of switching-inhibited section in the driving switching preparation section as shown in FIG. 41. Since switching from automatic driving to manual driving is not permitted in the switching-inhibited section, a substantial length of the driving switching preparation section is shortened by a total of lengths of the N pieces of switching-inhibited section. In this case, as shown in FIG. 42, the driving switching preparation section compensation unit 15 lengthens the driving switching preparation section by moving a position of a start point AP of the driving switching preparation section to a front side (a side closer to the subject vehicle). This compensates a length of the driving switching preparation section that has been substantially shortened by the presence of the switching-inhibited section.

Even if there is the switching-inhibited section in the driving switching preparation section, the process of the driving switching preparation section compensation unit 15 allows a substantial length of the driving switching preparation section to be sufficiently secured. In addition, since the driving switching preparation section compensation unit 15 does not move a position of an end point of the driving switching preparation section (that is, an end point of the automatic driving section), the length of the automatic driving section is maintained.

Note that an automatic driving control plan creation unit 11 of the present embodiment sends an automatic driving control plan after the driving switching preparation section is compensated by the driving switching preparation section compensation unit 15, to a travel controller 1 and a notification processor 22.

Here, a portion extended by the driving switching preparation section compensation unit 15 in order to compensate the length of the driving switching preparation section, that is, a section between a position of the start point AP of the driving switching preparation section before compensation and a position of the start point AP of the driving switching preparation section after compensation is referred to as "compensation section". When a length of the driving switching preparation section before compensation is LP0 and a length of the compensation section is LC, a length LP1 of the driving switching preparation section after compensation is expressed as LP1 LP0+LC.

Figure 43:
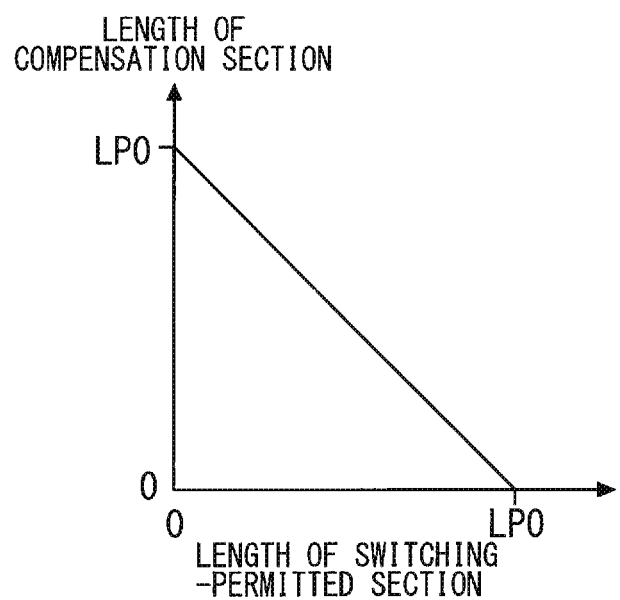
FIG. 43 is a view showing an example of a calculation method of a length of a compensation section.

FIG. 42 shows an example in which the length LC of the compensation section is made equal to the length of the switching-inhibited section (or a total length if there are a plurality of switching-inhibited sections). That is, when a length of each of the N pieces of switching-inhibited section is LD [x], the length LC of the compensation section is expressed as LC=LD [1]++LD [N]. In this case, a relationship between a length of a switching-permitted section (a part other than the switching-inhibited section in the driving switching preparation section) and the length of the compensation section is as shown in a graph of FIG. 43. According to this method, the substantial length of the driving switching preparation section can be made equivalent to that in a case where there is no switching-inhibited section.

Figure 44:
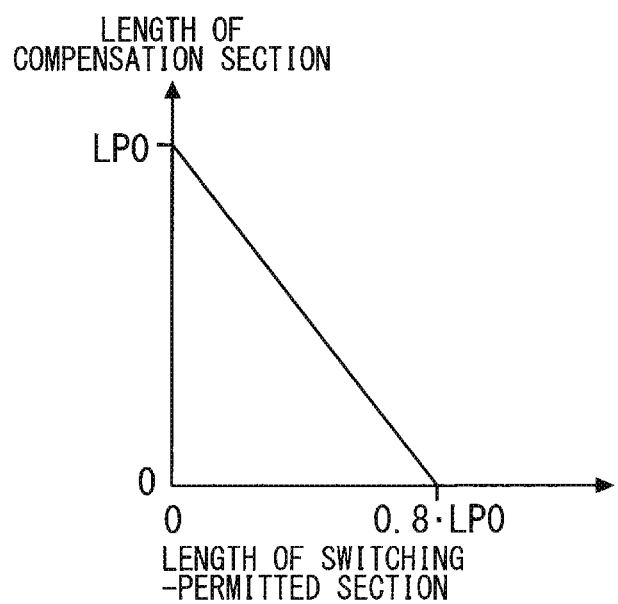
FIG. 44 is a view showing an example of the calculation method of a length of the compensation section.

However, since the driving switching preparation section compensation unit 15 determines the driving switching preparation section with a length that is more than sufficient with a margin, it is considered that there is no problem even if the substantial length of the driving switching preparation section becomes short to an extent. Therefore, when the length of the switching-inhibited section is shorter than a predetermined threshold value, or when the length of the driving switching preparation section excluding the switching-inhibited section is longer than a predetermined threshold value, it is not necessary to lengthen the driving switching preparation section. For example, when the length of the switching-inhibited section is 20% or less of the length of the driving switching preparation section, the driving switching preparation section may not be lengthened. In this case, a relationship between the length of the switching-permitted section and the length of the compensation section is represented by a graph of FIG. 44.

Figure 45:
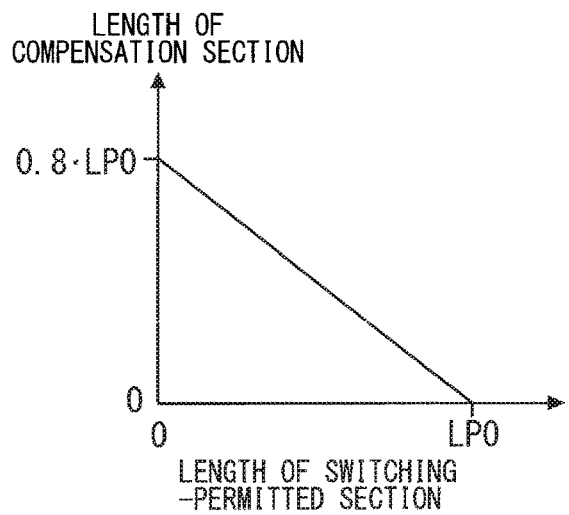
FIG. 45 is a view showing an example of the calculation method of a length of the compensation section.

Further, for a similar reason, an amount to be lengthened in the driving switching preparation section by the driving switching preparation section compensation unit 15 (that is, the length of the compensation section) may be made shorter than the length of the switching-inhibited section. For example, the length of the compensation section may be 80% of the length of the switching-inhibited section. In this case, a relationship between the length of the switching-permitted section and the length of the compensation section is represented by a graph of FIG. 45.

Figure 46:
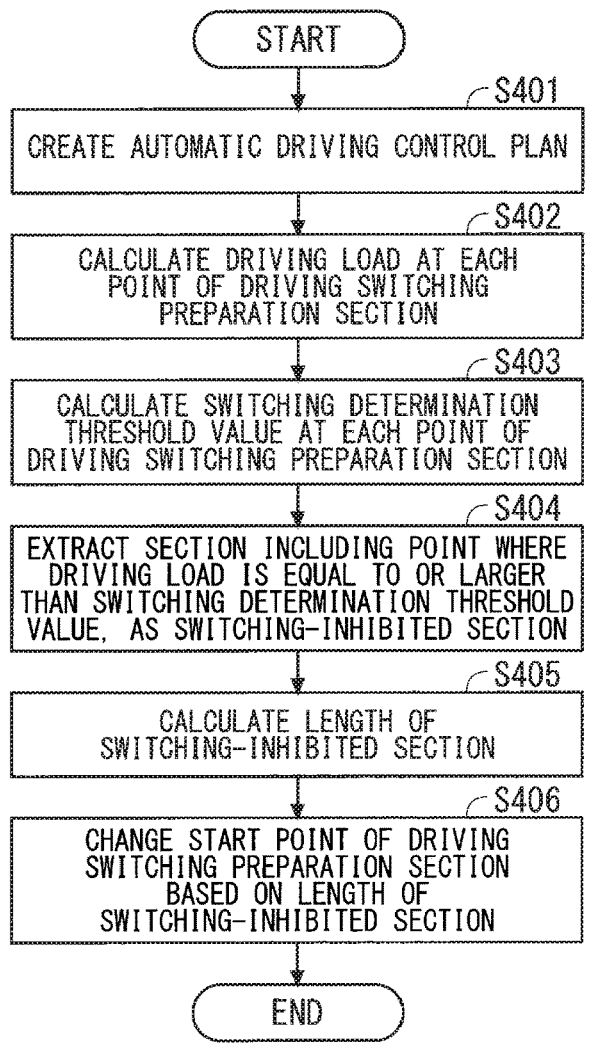
FIG. 46 is a flowchart showing an automatic driving control planning process according to the third embodiment.

Note that an operation of the vehicle control system of the third embodiment is similar to the flow of FIG. 22 described in the second embodiment. However, unlike in the second embodiment, the automatic driving control planning process in step S301 is the flow of FIG. 46. In the flow of FIG. 46, steps S405 and S406 to be described later are added to the flow of FIG. 23.

In the automatic driving control planning process of FIG. 46, first, the automatic driving control plan creation unit 11 creates an automatic driving control plan on the basis of a planned traveling route of the subject vehicle and map information acquired from a map information storage 21 (step S401). The automatic driving control plan includes a plan of the automatic driving section and a plan of the driving switching preparation section.

Next, the driving load calculation unit 12 calculates a driving load when the driver manually drives the subject vehicle, for each point of the driving switching preparation section planned in step S401 (step S402). Subsequently, a permission standard relaxation unit 14 calculates a switching determination threshold value for each point of the driving switching preparation section (step S403). At this time, the permission standard relaxation unit 14 increases the switching determination threshold value as the point is closer to the end point of the driving switching preparation section.

Then, the driving switching permission determination unit 13 extracts, as a switching-inhibited section, a section where the driving load is equal to or larger than the switching determination threshold value, on the basis of the driving load at each point calculated in step S402 and the switching determination threshold value at each point calculated in step S403 (step S404). In the above step S403, by increasing the switching determination threshold value as the point is closer to the end point of the driving switching preparation section, the permission standard relaxation unit 14 can shorten the length of the switching-inhibited section generated particularly in the latter half of the driving switching preparation section.

Furthermore, the driving switching permission determination unit 13 calculates a length of the extracted switching-inhibited section (step S405). When there are a plurality of switching-inhibited sections, a total of lengths of these is calculated in step S405.

Then, as shown in FIGS. 41 and 42, on the basis of the length of the switching-inhibited section calculated in step S405, the driving switching preparation section compensation unit 15 changes the start point of the driving switching preparation section to lengthen the driving switching preparation section (step S406).

In the third embodiment, even if there is the switching-inhibited section in the driving switching preparation section, a sufficient length is secured in the driving switching preparation section by performing the automatic driving control planning process of FIG. 46. Note that, when no switching-inhibited section is extracted in step S404, the length of the switching-inhibited section becomes 0, so that step S405 and step S406 may be skipped.

Fourth Embodiment

FIG. 47 is a block diagram showing a configuration of a vehicle control system according to a fourth embodiment of the present invention. The configuration of the vehicle control system in FIG. 47 is a configuration in which a traffic information acquisition apparatus 23 is added to the configuration in FIG. 1. The traffic information acquisition apparatus 23 acquires traffic information such as traffic jam information, construction section information, and lane regulation information, for example. Traffic information acquired by the traffic information acquisition apparatus 23 is inputted to a driving load calculation unit 12.

Further, in the present embodiment, to the driving load calculation unit 12 is inputted peripheral information from a peripheral information detector 30, and inputted information (hereinafter referred to as "automatic driving information") indicating a situation of automatic driving of the subject vehicle from a travel controller 1.

In the fourth embodiment, in consideration of at least one of traffic information provided from the traffic information acquisition apparatus 23, peripheral information provided from the peripheral information detector 30, or automatic driving information provided from the travel controller 1, the driving load calculation unit 12 calculates a driving load when the subject vehicle is manually driven. Except for that, an operation of the vehicle control system is similar to that in the first embodiment (FIGS. 13 and 14).

When traffic information is taken into consideration, for example, it is preferable to calculate the driving load to be higher while the subject vehicle is traveling in a traffic jam occurrence section, a construction section, a lane restriction section, and the like.

When peripheral information is taken into consideration, for example, it is preferable to calculate the driving load of the subject vehicle to be higher in a situation where there are many non-subject vehicles around the subject vehicle, a situation where a distance between the subject vehicle and a non-subject vehicle is short, and a situation where there is a non-subject vehicle having a vehicle rank largely different from the subject vehicle (e.g., a body size and a category such as a maximum output of an engine or a motor) around the subject vehicle.

When automatic driving information is taken into consideration, for example, it is preferable to calculate the driving load of the subject vehicle to be higher while the subject vehicle is accelerating or decelerating, while the subject vehicle is passing a non-subject vehicle, while the subject vehicle is changing a lane, and the like.

Further, in the future, if it becomes possible to acquire more detailed information of a non-subject vehicle as peripheral information by inter-vehicle communication, it is conceivable to use it. For example, it is preferable to calculate the driving load to be higher in a situation where there is a non-subject vehicle having a low automation level around the subject vehicle, and a situation where a driver of a non-subject vehicle around the subject vehicle is performing an operation other than driving (hands-free calling, an operation of audio equipment, and the like). Furthermore, a travel record around the subject vehicle (a travel record of automatic driving and a travel record of manual driving), and an attribute of a driver (years of driving experience, an accident history, age, and the like) may also be taken into consideration in calculating the driving load of the subject vehicle.

According to the fourth embodiment, a driving switching permission determination unit 13 determines whether or not to permit switching of the subject vehicle from automatic driving to manual driving in consideration of traffic information, a situation of a non-subject vehicle around the subject vehicle, and a situation of automatic driving of the subject vehicle, so that more appropriate determination becomes possible.

Fifth Embodiment

Figure 48:
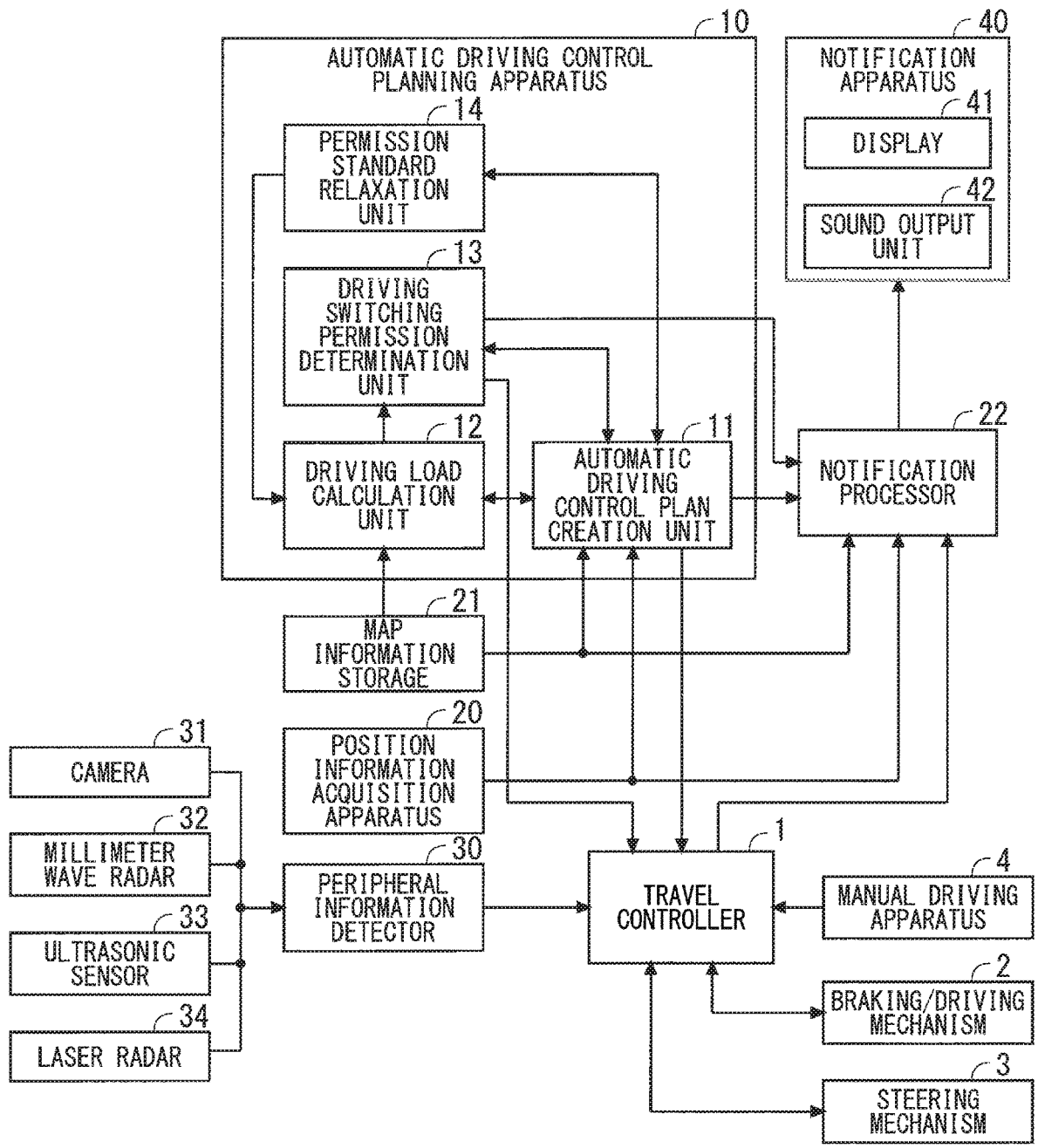
FIG. 48 is a block diagram showing a configuration of a vehicle control system according to a fifth embodiment.

FIG. 48 is a block diagram showing a configuration of a vehicle control system according to a fifth embodiment of the present invention. In each of the above-described embodiments, in order to relax a standard for permitting switching of the subject vehicle from automatic driving to manual driving, the permission standard relaxation unit 14 controls a switching determination threshold value of the driving switching permission determination unit 13. In contrast, in the fifth embodiment, an operation of a driving load calculation unit 12 is controlled to relax a standard for permitting switching of the subject vehicle from automatic driving to manual driving.

Figure 49:
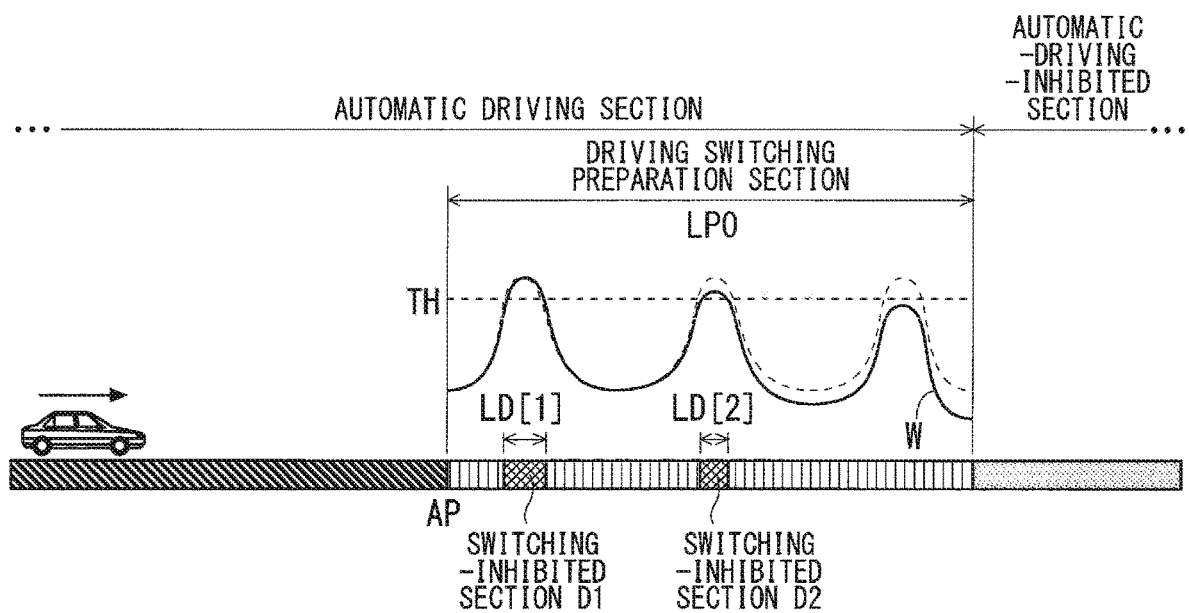
FIG. 49 is a view for explaining an operation of the permission standard relaxation unit.

Specifically, a permission standard relaxation unit 14 causes the driving load calculation unit 12 to calculate the driving load to be lower as the subject vehicle approaches an end point of a driving switching preparation section. For example, when it is assumed that a driving load W in the driving switching preparation section is calculated with the waveform shown in FIG. 6 in the first embodiment, the driving load W is calculated to be lower as a position is closer to the end point of the driving switching preparation section in the fifth embodiment, as shown in FIG. 49. Meanwhile, a switching determination threshold value TH may be fixed.

In the case of FIG. 49 as well, as in FIG. 8, only two switching-inhibited sections D1 and D2 are generated within the driving switching preparation section (the switching-inhibited section D3 in FIG. 7 is not generated). In addition, the lengths of the switching-inhibited sections D1 and D2 are shorter than those in the case of FIG. 7. Therefore, the substantial length of the driving switching preparation section is secured longer than that in the case of FIG. 7.

Note that, as a method for causing the driving load calculation unit 12 to calculate the driving load to be lower as the position is closer to the end point of the driving switching preparation section, for example, it is conceivable to multiply a driving load obtained by the method of the first embodiment by a coefficient that decreases as the position is closer to the end point of the driving switching preparation section. Alternatively, it is also possible to subtract, from the driving load obtained by the method of the first embodiment, a variable that increases as the position is closer to the end point of the driving switching preparation section.

As described above, in the fifth embodiment as well, it is possible to shorten the length of the switching-inhibited section generated particularly in the latter half of the driving switching preparation section. Further, depending on conditions, it is possible to reduce the number of switching-inhibited sections generated in the driving switching preparation section. Therefore, an effect similar to that of the first embodiment can be obtained. Further, the present embodiment can be applied to any of the first to fourth embodiments.

It should be noted that the present invention can freely combine each embodiment within the scope of the invention, and can deform or omit each embodiment as appropriate.

While this invention has been described in detail, the foregoing description is in all aspects illustrative and the invention is not limited thereto. It is understood that innumerable modifications not illustrated can be envisaged without departing from the scope of the present invention.

EXPLANATION OF REFERENCE SIGNS

1: travel controller
2: braking/driving mechanism
3: steering mechanism
4: manual driving apparatus
10: automatic driving control planning apparatus
11: automatic driving control plan creation unit
12: driving load calculation unit
13: driving switching permission determination unit
14: permission standard relaxation unit
15: driving switching preparation section compensation unit
20: position information acquisition apparatus
21: map information storage
22: notification processor
23: traffic information acquisition apparatus
30: peripheral information detector
31: camera
32: millimeter wave radar
33: ultrasonic sensor
34: laser radar
40: notification apparatus
41: display
42: sound output unit
50: processing circuit
51: processor
52: memory
60: instrument panel
70: image of subject vehicle
71: frame image
72: image representing a road
100: section display bar
100a: switching-inhibited section mark
101: subject vehicle position mark
110: map image
111: subject vehicle position mark
150: graph image
150a: graph of driving load
150b: graph of switching determination threshold value
151: subject vehicle position mark

The invention claimed is:
1. An automatic driving control planning apparatus comprising:
a processor to execute a program; and
a memory to store the program which, when executed by the processor, performs processes of:
creating an automatic driving control plan including a plan of an automatic driving section that is a section in which a subject vehicle is automatically driven, and a plan of a driving switching preparation section that is a section for switching the subject vehicle from automatic driving to manual driving at a final stage of the automatic driving section;
calculating, for each point of the driving switching preparation section, a driving load applied to a driver when the driver manually drives the subject vehicle;
permitting switching of the subject vehicle from automatic driving to manual driving at a point where the calculated driving load is smaller than a predetermined threshold value, and not permitting switching of the subject vehicle from automatic driving to manual driving at a point where the calculated driving load is equal to or larger than the threshold value; and
relaxing a standard for permitting switching of the subject vehicle from automatic driving to manual driving as the subject vehicle approaches an end point of the driving switching preparation section, by making the driving load difficult to exceed the threshold value.

2. The automatic driving control planning apparatus according to claim 1, wherein
the processor increases the threshold value as the subject vehicle approaches an end point of the driving switching preparation section.

3. The automatic driving control planning apparatus according to claim 1,
the processor calculates the driving load to be lower as the subject vehicle approaches an end point of the driving switching preparation section.

4. The automatic driving control planning apparatus according to claim 1, wherein
the processor calculates the driving load based on a road shape or a road attribute at each point of the driving switching preparation section, traffic information, or a situation of a non-subject vehicle that is present around the subject vehicle.

5. The automatic driving control planning apparatus according to claim 1, wherein
the processor calculates the driving load in consideration of a situation of automatic driving of the subject vehicle.

6. The automatic driving control planning apparatus according to claim 1, wherein
a start point of the driving switching preparation section can be changed by the driver; and
when a length of the driving switching preparation section becomes longer than a predetermined threshold value as a result of changing a start point of the driving switching preparation section by the driver, the processor does not relax a standard for permitting switching of the subject vehicle from automatic driving to manual driving for the driving switching preparation section.

7. The automatic driving control planning apparatus according to claim 1, wherein
the processor notifies the driver that the subject vehicle enters the driving switching preparation section, by using a notification apparatus that notifies the driver.

8. The automatic driving control planning apparatus according to claim 1, wherein the processor notifies the driver of a current situation as to whether or not switching from automatic driving to manual driving is permitted, by using a notification apparatus that makes a notification to the driver while the subject vehicle travels in the driving switching preparation section.

9. The automatic driving control planning apparatus according to claim 1, wherein
the processor previously predicts and calculates the driving load at each point in the driving switching preparation section;
the processor extracts in advance, from the driving switching preparation section, a switching-inhibited section that is a section in which switching from automatic driving to manual driving is not permitted, based on the predicted driving load at each point; and
the processor notifies the driver of whether or not the subject vehicle is located within the switching-inhibited section, by using a notification apparatus that makes a notification to the driver, while the subject vehicle travels in the driving switching preparation section.

10. The automatic driving control planning apparatus according to claim 9, wherein
the notification apparatus comprises a display; and
the processor causes the display to display an image showing a positional relationship between the subject vehicle and the switching-inhibited section.

11. The automatic driving control planning apparatus according to claim 10, wherein
an image showing a positional relationship between the subject vehicle and the switching-inhibited section is an image obtained by synthesizing an image showing a position of the subject vehicle on an image linearly representing the driving switching preparation section including the switching-inhibited section.

12. The automatic driving control planning apparatus according to claim 11, wherein
the processor displays an image showing a position of the subject vehicle at a fixed position on a screen of the display, and causes an image linearly representing the driving switching preparation section to be scrolled in accordance with a change of a position of the subject vehicle.

13. The automatic driving control planning apparatus according to claim 10, wherein
an image showing a positional relationship between the subject vehicle and the switching-inhibited section is an image of a map showing a position of the subject vehicle and a position of the switching-inhibited section.

14. The automatic driving control planning apparatus according to claim 10, wherein
an image showing a positional relationship between the subject vehicle and the switching-inhibited section is an image obtained by synthesizing an image showing a position of the subject vehicle on a graph image showing the driving load and the threshold value at each point in the switching-inhibited section.

15. The automatic driving control planning apparatus according to claim 10, wherein
the display is disposed in an instrument panel of the subject vehicle.

16. The automatic driving control planning apparatus according to claim 9, wherein
the processor changes a start point of the driving switching preparation section to lengthen the driving switching preparation section in accordance with a length of the switching-inhibited section when there is the switching-inhibited section in the driving switching preparation section.

17. The automatic driving control planning apparatus according to claim 16, wherein
the processor determines an amount for lengthening the driving switching preparation section, based on a length of the switching-inhibited section.

18. The automatic driving control planning apparatus according to claim 16, wherein
when a length of the switching-inhibited section is shorter than a predetermined threshold value, the processor does not lengthen the driving switching preparation section.

19. The automatic driving control planning apparatus according to claim 16, wherein
when a length of the driving switching preparation section excluding the switching-inhibited section is longer than a predetermined threshold value, the processor does not lengthen the driving switching preparation section.

20. An automatic driving control planning method comprising:
creating an automatic driving control plan including a plan of an automatic driving section that is a section in which a subject vehicle is automatically driven, and a plan of a driving switching preparation section that is a section for switching the subject vehicle from automatic driving to manual driving at a final stage of the automatic driving section;
calculating, for each point of the driving switching preparation section, a driving load applied to a driver when the driver manually drives the subject vehicle;
permitting switching of the subject vehicle from automatic driving to manual driving at a point where the calculated driving load is smaller than a predetermined threshold value, and not permitting switching of the subject vehicle from automatic driving to manual driving at a point where the calculated driving load is equal to or larger than the threshold value; and
relaxing a standard for permitting switching of the subject vehicle from automatic driving to manual driving as the subject vehicle approaches an end point of the driving switching preparation section, by making the driving load difficult to exceed the threshold value.

* * * * *